United States Patent
Gross et al.

(10) Patent No.: US 9,633,139 B2
(45) Date of Patent: *Apr. 25, 2017

(54) METHODS AND SYSTEMS FOR SEARCH INDEXING

(71) Applicant: Future Search Holdings, Inc., Pasadena, CA (US)

(72) Inventors: William Gross, Pasadena, CA (US); Steven Lee Colwell, Santa Barbara, CA (US)

(73) Assignee: Future Search Holdings, Inc., Pasadena, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 14/507,519

(22) Filed: Oct. 6, 2014

(65) Prior Publication Data
US 2015/0095363 A1  Apr. 2, 2015

Related U.S. Application Data

(63) Continuation of application No. 11/972,563, filed on Jan. 10, 2008, now Pat. No. 8,856,093, which is a continuation of application No. 10/654,588, filed on Sep. 3, 2003, now Pat. No. 7,370,035.

(60) Provisional application No. 60/408,015, filed on Sep. 3, 2002, provisional application No. 60/413,013, filed on Sep. 23, 2002, provisional application No. 60/448,923, filed on Feb. 20, 2003, provisional application No. 60/470,903, filed on May 14, 2003,
(Continued)

(51) Int. Cl.
*G06F 17/30* (2006.01)
*H04L 12/58* (2006.01)

(52) U.S. Cl.
CPC .. *G06F 17/30985* (2013.01); *G06F 17/30861* (2013.01); *G06F 17/30864* (2013.01); *G06F 17/30964* (2013.01); *H04L 51/22* (2013.01)

(58) Field of Classification Search
CPC .................. G06F 17/30864; G06F 17/30964
USPC ........................................... 707/705
See application file for complete search history.

(56) References Cited

U.S. PATENT DOCUMENTS

| | | | |
|---|---|---|---|
| 5,111,398 A | 5/1992 | Nunberg et al. | |
| 5,303,361 A | 4/1994 | Colwell et al. | |

(Continued)

FOREIGN PATENT DOCUMENTS

| | | |
|---|---|---|
| WO | WO 99/01802 | 1/1999 |
| WO | WO 99/39286 | 8/1999 |

(Continued)

OTHER PUBLICATIONS

Lotus Magellan Product Information Guide, Circa 1989.
(Continued)

*Primary Examiner* — Fred I Ehichioya
*Assistant Examiner* — Johnese Johnson
(74) *Attorney, Agent, or Firm* — Knobbe, Martens, Olson, & Bear LLP

(57) ABSTRACT

The present invention provides for quick and efficient searching. One embodiment includes a first instruction configured to read at least a first search string and a second search string entered into a same first search field, and a second instruction configured to incrementally filter search results to locate at least a first document that has a least a first word that begins with the first string and a second word that begins with the second string.

27 Claims, 23 Drawing Sheets

Related U.S. Application Data provisional application No. 60/478,960, filed on Jun. 13, 2003.

(56) References Cited

U.S. PATENT DOCUMENTS

| | | | |
|---|---|---|---|
| 5,671,426 | A | 9/1997 | Armstrong, III |
| 5,692,173 | A | 11/1997 | Chew |
| 5,721,897 | A | 2/1998 | Rubinstein |
| 5,778,361 | A | 7/1998 | Nanjo et al. |
| 5,819,273 | A | 10/1998 | Vora et al. |
| 5,832,208 | A | 11/1998 | Chen et al. |
| 5,907,837 | A | 5/1999 | Ferrel et al. |
| 5,920,854 | A | 7/1999 | Kirsch et al. |
| 6,006,225 | A | 12/1999 | Bowman |
| 6,035,325 | A | 3/2000 | Potts |
| 6,070,158 | A | 5/2000 | Kirsch et al. |
| 6,073,133 | A | 6/2000 | Chrabaszcz |
| 6,085,193 | A | 7/2000 | Malkin et al. |
| 6,112,172 | A | 8/2000 | True et al. |
| 6,182,068 | B1 | 1/2001 | Culliss |
| 6,216,122 | B1 | 4/2001 | Elson |
| 6,330,567 | B1 | 12/2001 | Chao |
| 6,366,923 | B1 | 4/2002 | Lenk et al. |
| 6,421,675 | B1 | 7/2002 | Ryan et al. |
| 6,564,213 | B1 | 5/2003 | Ortega et al. |
| 6,606,304 | B1 | 8/2003 | Grinter et al. |
| 6,615,237 | B1 | 9/2003 | Kyne et al. |
| 6,665,668 | B1 | 12/2003 | Sugaya et al. |
| 6,704,747 | B1 | 3/2004 | Fong |
| 6,711,565 | B1 | 3/2004 | Subramaniam et al. |
| 6,751,603 | B1 | 6/2004 | Bauer et al. |
| 6,757,713 | B1 | 6/2004 | Ogilvie et al. |
| 6,847,959 | B1 | 1/2005 | Arrouye et al. |
| 6,862,713 | B1 | 3/2005 | Kraft et al. |
| 6,873,982 | B1 | 3/2005 | Bates et al. |
| 6,961,731 | B2 | 11/2005 | Holbrook |
| 7,035,903 | B1 | 4/2006 | Baldonado |
| 7,047,502 | B2 | 5/2006 | Petropoulos et al. |
| 7,054,855 | B2 | 5/2006 | Basso et al. |
| 7,370,035 | B2 | 5/2008 | Gross et al. |
| 7,424,510 | B2 | 9/2008 | Gross et al. |
| 7,496,559 | B2 | 2/2009 | Gross et al. |
| 8,019,741 | B2 | 9/2011 | Gross et al. |
| 2001/0027406 | A1 | 10/2001 | Araki et al. |
| 2001/0029508 | A1 | 10/2001 | Okada et al. |
| 2001/0039490 | A1 | 11/2001 | Verbitsky et al. |
| 2002/0007384 | A1* | 1/2002 | Ushioda ............ G06F 17/30569 715/264 |
| 2002/0019679 | A1 | 2/2002 | Okada et al. |
| 2002/0055981 | A1* | 5/2002 | Spaey ............................ 709/217 |
| 2002/0087408 | A1 | 7/2002 | Burnett |
| 2002/0092019 | A1 | 7/2002 | Marcus |
| 2002/0111962 | A1 | 8/2002 | Crucs |
| 2002/0165707 | A1* | 11/2002 | Call ................................. 704/2 |
| 2002/0169763 | A1 | 11/2002 | Tada et al. |
| 2002/0178009 | A1 | 11/2002 | Firman |
| 2002/0184317 | A1* | 12/2002 | Thankachan ................. 709/206 |
| 2003/0014415 | A1 | 1/2003 | Weiss et al. |
| 2003/0037321 | A1 | 2/2003 | Bowen |
| 2003/0130993 | A1 | 7/2003 | Mendelevitch et al. |
| 2003/0171910 | A1 | 9/2003 | Abir |
| 2003/0227489 | A1 | 12/2003 | Arend et al. |
| 2003/0229898 | A1 | 12/2003 | Babu et al. |
| 2003/0233419 | A1 | 12/2003 | Beringer |
| 2004/0073443 | A1 | 4/2004 | Gabrick et al. |
| 2004/0133564 | A1* | 7/2004 | Gross ................ G06F 17/30398 |
| 2004/0143564 | A1 | 7/2004 | Gross et al. |
| 2004/0143569 | A1 | 7/2004 | Gross et al. |
| 2005/0256846 | A1 | 11/2005 | Zigmond et al. |
| 2006/0168067 | A1 | 7/2006 | Carlson et al. |
| 2008/0114761 | A1 | 5/2008 | Gross et al. |
| 2009/0150363 | A1 | 6/2009 | Gross et al. |

FOREIGN PATENT DOCUMENTS

| | | |
|---|---|---|
| WO | WO 00/67159 | 11/2000 |
| WO | WO 2004/023243 | 3/2004 |

OTHER PUBLICATIONS

Lotus Magellan Explorer's Guide © 1989 Lotus Development Corporation.
Chris Sherman, "Enfish Tracker Pro," © Jan. 1999; printed from http://www.onlinemag.net/OL1999/sherman1.html.
Jon Halpin, "PC Data Finder Goes A-Hunting," Jun. 19, 2001; printed from http://www.pcmag.com/article2/0,4149,144228,00.asp.
Carol Ellison, "Info to Go," Jun. 30, 2002; printed from http://www.pcmag.com/article2/0,1759,3575.00.asp.
Steve Barth, Personal Toolkit: Navigating Information and Ideas, KMWorld Apr. 2003, vol. 12, Issue 4; printed from http://www.kmworld.com/publications/magazine/Index.cfm?action=readarticle&article id-1505&publication id=1.
International Search Report from corresponding PCT Application PCT/US03/27241.
Chapter 14, Section 14.5 "JavaScript & DHTML Cookbook" by Danny Goodman; ISBN:0-596-00467-2; Publisher: O'Reilly; Print Publication Date Apr. 1, 2003.
Stop words, Wikipedia, http://en.wikipedia.org/wiki/Stop_words; Dec. 12, 2006.
Inverted index, Wikipedia, http://en.wikipedia.org/wiki/Inverted_index; Dec. 12, 2006.
Proximity search (text), Wikipedia, http://en.wikipedia.org/wiki/Proximity_search_%28text%29; Dec. 12, 2006.
Computing Service, Email Addresses in Microsoft Outlook 98, Dec. 5, 2000, pp. 1-3.
http://www2.essex.ac.uk/cs/services/email/addressing2.html—searched on www.waybackmachine.com—Internet Archive Wayback Machine.
Pogue, David, *Finding Files and Web Sites with Sherlock 2*, MAC OS 9: The Missing Manual, Chapter 15, pp. 257-278, Mar. 30, 2000.
Shneiderman, B., et al., *Clarifying Search: A User-Interface Framework for Test Searches*, D-Lib Magazine, Jan. 1997.
Supplementary Search Report for EP 03794539.1, filed Sep. 3, 2003.
International Search Report for PCT/US2003/027241, filed Sep. 3, 2003.

* cited by examiner

FIG. 3C

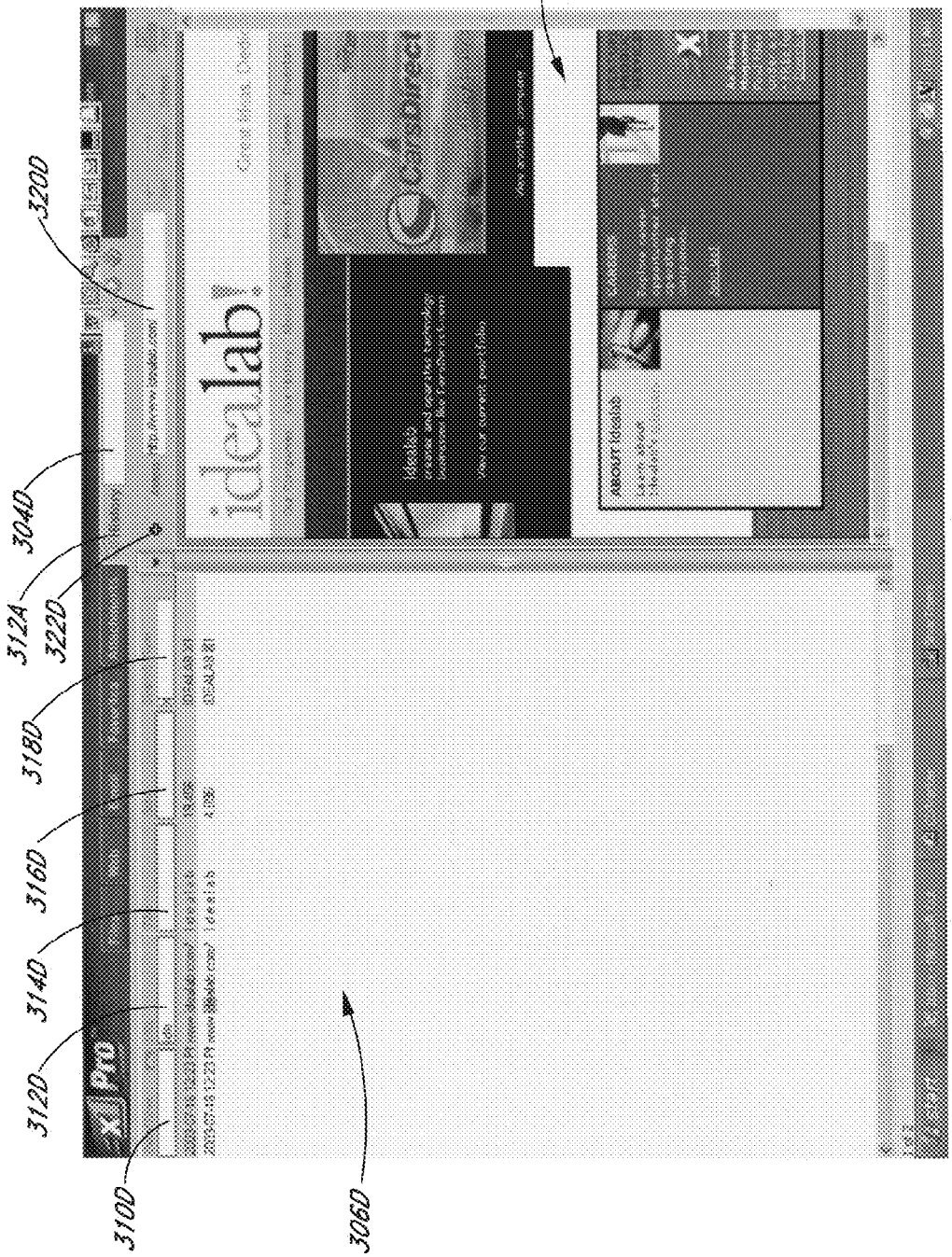

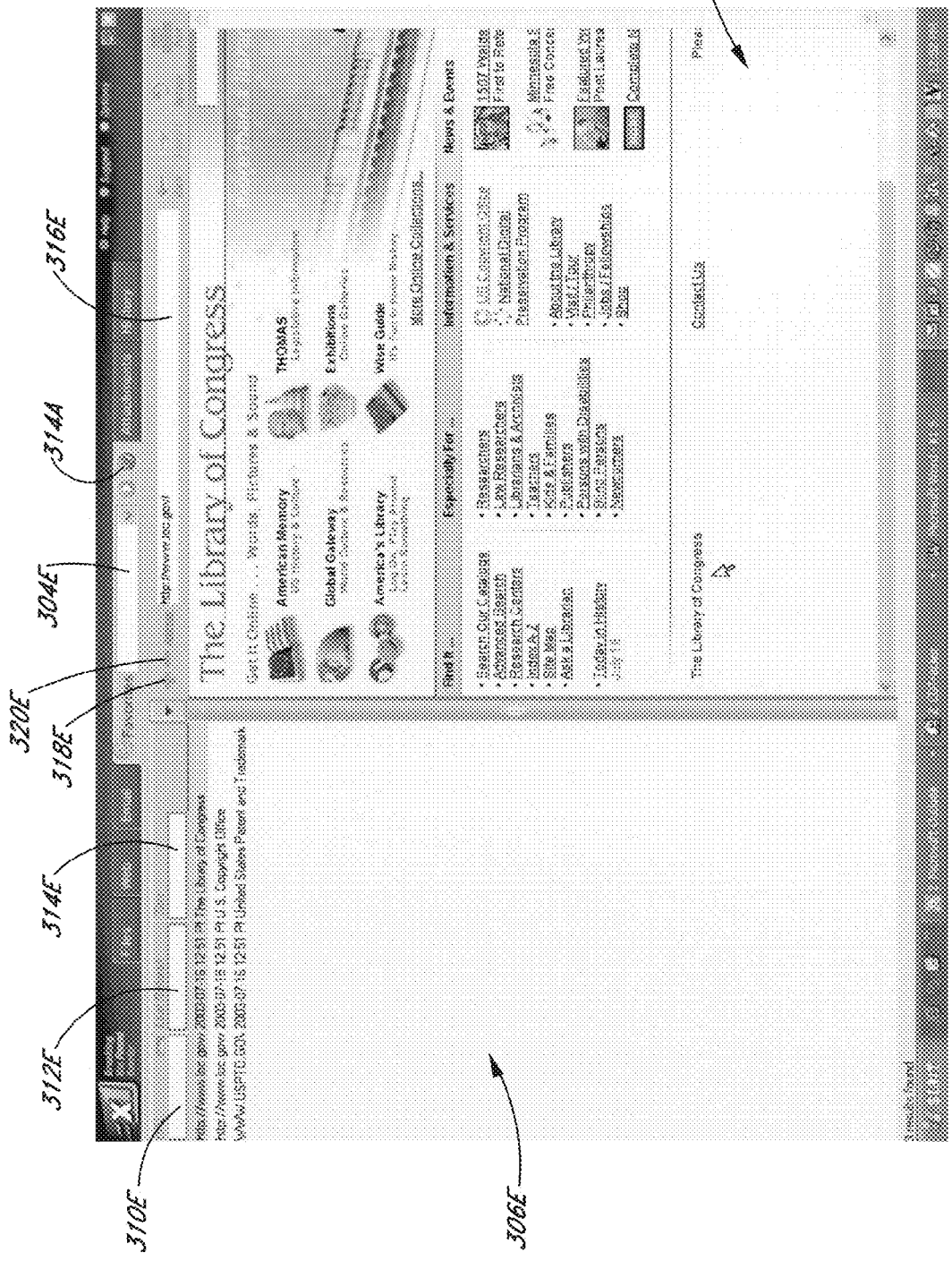

FIG. 3G

METHODS AND SYSTEMS FOR SEARCH INDEXING

PRIORITY CLAIM

This application is a continuation of U.S. patent application Ser. No. 11/972,563, filed on Jan. 10, 2008, which is a continuation of U.S. patent application Ser. No. 10/654,588, filed on Sep. 3, 2003, which claims priority under 35 U.S.C. §119(e) to U.S. Provisional Application No. 60/408,015, filed Sep. 3, 2002, U.S. Provisional Application No. 60/413,013, filed Sep. 23, 2002, U.S. Provisional Application No. 60/448,923, filed Feb. 20, 2003, U.S. Provisional Application No. 60/470,903, filed May 14, 2003, and U.S. Provisional Application No. 60/478,960, filed Jun. 13, 2003, each of which is hereby expressly incorporated by reference in their entireties.

RELATED APPLICATIONS

This application is related to copending application entitled APPARATUS AND METHODS FOR LOCATING DATA, Ser. No. 10/654,595, and copending application entitled METHODS AND SYSTEMS FOR WEB-BASED INCREMENTAL SEARCHES, Ser. No. 10/654,596, each of which were filed on the same date as U.S. patent application Ser. No. 10/654,588, entitled METHODS AND SYSTEMS FOR SEARCH INDEXING, the entirety of which are hereby incorporated by reference.

BACKGROUND

Field

The present invention relates generally to data processing, and in particular to systems and methods for locating data.

Description of the Related Art

Conventional search application programs often are slow and cumbersome to use. For example, many search engines require the user to type in a search term, click on a search button, and review the results. If the user is not satisfied with the results, as might be the case if too many items or items that are not of interest are found, then the user needs to edit the search terms, click on an initiate search button, and again review the results. In addition, many search application programs only provide for limited search filtering, wherein the user is limited to filtering the search based on dates, file location, and file contents.

Another drawback of some search engines is that the actual search process takes an annoying amount of time to complete a search. Furthermore, some search engines do not include search features directed to specific types of search targets, such as email, Web pages, and files. Alternatively and inconveniently, separate tools may be needed to search for email, Web pages, and files if the user desires corresponding specific search features.

Further, with many Web-based search systems, the user types in a search phrase in a Web page search field presented via a browser on the user's computer screen, and then presses an Enter key or Search button to have the query transmitted to a remote server system that will perform the search. The server processes the query, generates a list of search results, and sends the list back to the user's browser. The user then clicks on one of the choices, whereupon a target page is displayed. The process from the time the user starts typing, until the user sees the target page, can take at least 5 seconds, and often takes 30 seconds or more.

Because of the turnaround time for typing in a search phrase to receiving search results, this conventional search procedure can demand a deliberative and tedious strategy from the user in order to search efficiently. First the user may think carefully regarding what search terms to use, the user then enters the search term, initiates the search, after several seconds receives and reviews the list of results, decides which, if any of the results seem relevant enough to click on, click on a selected list item, wait several seconds for the corresponding Web page to be returned and displayed on the user's browser, and finally reviews the Web page.

SUMMARY

One example embodiment of the present invention advantageously provides for incremental or reactive searching of a variety of search targets. For example, the search targets can include one or more of files, emails, email attachments, Web pages, specific databases, and/or the like. Because a search is performed incrementally, the search results are provided or narrowed substantially immediately after each character in a search string is entered by a user. Thus, the user is provided with substantially immediate feedback as the search string is being entered, and so can quickly decide on the desirability of entering additional search characters, entering a new search string, or deleting one or more search string characters.

An example search application generates one or more indexes corresponding to the search target types. An index optionally includes both content information and attribute information for potential search targets. The attribute information can be specific to the type of search target. For example, the index can include at least partially different attribute information for files as compared to emails. The indexing is optionally performed incrementally.

One embodiment is a method of performing a search comprising: receiving at least a first search string and a second search string as the first and second search strings are being entered into the same search field; and incrementally locating at least a first document that has a least a first word that begins with the first string and a second word that begins with the second string.

Yet another embodiment is a search apparatus, comprising: a first instruction configured to read at least a first search string and a second search string entered into a same first search field; and a second instruction configured to incrementally filter search results to locate at least a first document that has a least a first word that begins with the first string and a second word that begins with the second string.

Still another embodiment is a search index system comprising: scan code that determines at least in part what files to index; index code that indexes files based at least in part on the scan code determination, wherein the index code is further configured to locate punctuation marks in at least a first search string and to treat at least a portion of the punctuation marks as string separators based at least in part on their location within the first search string.

One embodiment is a method of selectively performing a search and executing a command, the method comprising: receiving at least a first string in a search field; determining if the first string is a command; selectively initiating command execution in response to determining that the first string is a command; and selectively initiating a search if the first string is not a command.

Still another embodiment is a search apparatus, comprising: a first instruction configured to receive a first string entered into a search field; a second instruction configured to determine if the first string corresponds to a command; a third instruction configured to initiate command execution in response to determining that the first string corresponds to a command; and a fourth instruction configured to initiate a search if the first string is not a command.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIGS. 3A-I illustrate example user interfaces in accordance with one embodiment of the present invention.

Throughout the drawings, like reference numbers may be used to refer to items that are identical or functionally similar.

DETAILED DESCRIPTION OF PREFERRED EMBODIMENTS

Figure 1:
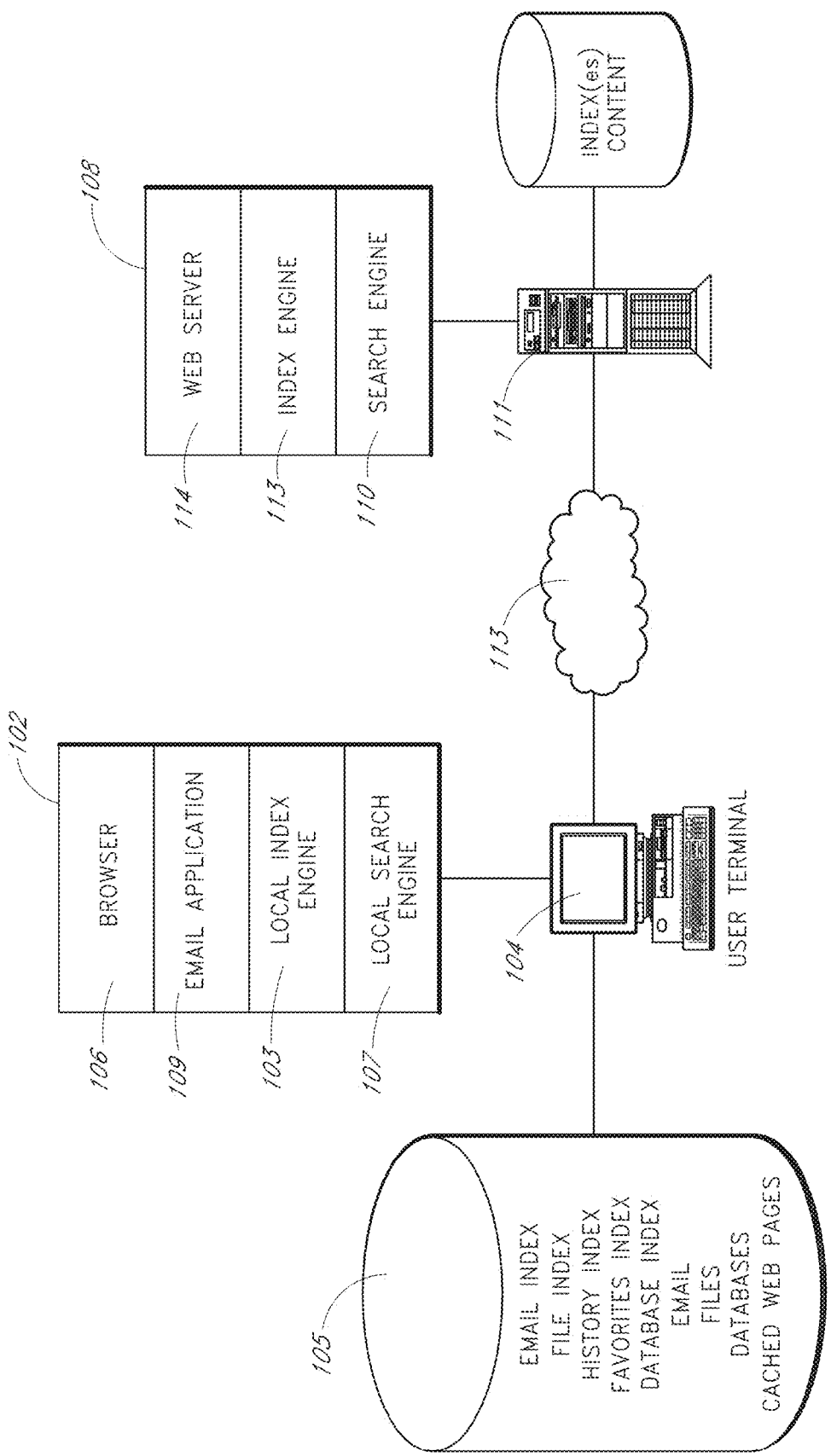
FIG. 1 illustrates an example computer system that can be used in accordance with one embodiment of the present invention.

Embodiments of the present invention provide systems and methods for searching, index, and presenting information. As will be described in greater detail below, in one example embodiment, a search apparatus provides multiple search fields corresponding to different search target characteristics. As a user enters in a search term into a field, the search results are refined incrementally with each entered character. Thus, the search results are shown as the user enters search characters or terms. To further refine or filter the search results, the user can enter other search terms into other fields. In one embodiment, the filtering process is performed substantially immediately upon the user entering addition search characters or terms.

Further, a user can incrementally broaden the search results by deleting or backspacing over previously entered search characters. The search results are broadened substantially immediately, in response to the user deleting or back spacing over a character, without requiring that the user click on or otherwise activate a "search" button or the like. A search, for example, can typically take 200 ms or less, though in some situations it can take longer, such as, for example, 300 ms, 400 ms, 600 ms, 1 second, or 2 seconds.

In one embodiment, a user interface includes a list area or pane, which lists the search results (optionally including headlines or summaries), and a view area or pane, which displays an item or contents of an item, such as an item selected in the list area. Advantageously, the user can customize an example search system in accordance with the user's preferences.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). In addition, reference is made to Java script (also referred to as JavaScript), though other types of script, programming languages, and code can be used as well. It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by executable code and instructions running on one or more general-purpose computers. However, the present invention can also be implemented using special purpose computers, state machines, and/or hardwired electronic circuits. The example processes described herein do not necessarily have to be performed in the described sequence, and not all states have to be reached or performed.

Further, while the following description may refer to "clicking on" a link or button, or pressing a key in order to provide a command or make a selection, the commands or selections can also be made using other input techniques, such as using voice input, pen input, mousing or hovering over an input area, and/or the like.

One example search system provides for incremental searching across a plurality of attribute fields for files, emails, email attachments, the Internet, other networks, prior Internet or other network search results ("history"), favorites, specific databases, and/or the like. In one example embodiment, the search system includes a client-based search application. Other embodiments can utilize a server-based search application.

One example search application includes tabs corresponding to an email search interface, a files search interface, a Web search interface, a favorites search interface, an email attachment interface, a Web history search interface, and/or a specific database search interface. Thus, in one example embodiment, a search application provides search specific interfaces for different types of search targets.

Optionally, all the tabs are efficiently displayed and selectable in a plurality screens. Thus, while viewing a first target search interface, a user can select a different search target interface by moving the cursor over a given tab and then clicking on the tab. In another embodiment, a list of interface links or a drop down menu can be used to select the target specific search interfaces. In addition, other methods of selecting the search target interfaces can be used as well. For ease of use, the different interfaces optionally have similar layouts with respect to the positioning of may of the interface elements, such as the list and view areas, the tabs, and main search field.

FIG. 1 illustrates example hardware and software components on a physical and/or functional level that can be invoked or used when performing a search and/or an indexing operation. As depicted, one embodiment includes a search application 102 stored on and executed by a user terminal 104. As will be described in greater detail below, the search application 102, provides user interfaces for searching email, files, Web sites, cached Web pages, databases and the like. In addition, the search application 102 has a local index engine 103 that indexes email, files, cached Web pages, databases and the like, stored in a data repository or database 105. For example Web pages previously viewed in the search application's view pane or area, and optionally, stored Web pages previously viewed using other user browsers, or otherwise stored locally can be indexed. Separate indexes can be used for the email, files, cached Web pages, databases and the like, or a single index can be used for the foregoing.

The index engine 103 can further include code configured as a scan engine or module that is used to determine whether a file is to be indexed. Thus, the index engine 103 can also scan files to identify new targets, such as email, document files, Web pages, database entries, and the like, that have not yet been indexed, or targets that have been previously been indexed but have since been modified. Optionally, rather then re-index all corresponding targets each time an index operation is performed, the index engine 103 can incrementally index just the new or modified targets or documents.

The index engine 103 can utilize one or more indexing algorithms to create an index, such as a reverse or inverted index. The index includes a data structure that associates character strings with files, documents, and the like. In one example embodiment, for each word or character string found with a file or document, the index stores which fields of which documents or files contain that word or character string.

In one example embodiment, the index is constructed in blocks, which for convenience will be referred to as incremental index bulks or bulks. In this example, there is an incremental index bulk for each indexed target type, such as files, email, favorites, email attachments, stored Web pages. By way of example, a bulk can be 4 Mbytes in size, 16 Mbytes in size, or other sizes. A given bulk can be a memory mapped block of volatile memory, such as DRAM or SRAM, in which list structures for the corresponding index are built. The bulks can be stored on slower mass memory, such as a hard disk drive, and then read into faster RAM upon startup of the search application. Advantageously, having the bulk memory mapped into RAM allows for fast searches and updating, as compared with having to translate the information from a disk storage format to a different RAM format.

When the bulk fills up so that the allocated memory space for the bulk is filled or substantially filled by the index data, the bulk is stored in non-volatile mass memory, such as a magnetic drive, and is termed a fixed index. The complete index for a given target type can include several fixed indexes and the bulk. As new documents or files are added to the index, they add to the bulk, rather than directly to the fixed indexes. Optionally, the bulk can be stored in mass, non-volatile memory, such as a hard disk drive, and read into RAM as needed.

In the example embodiment, when a predetermined number of fixed indexes, such as 5, are created the multiple fixed indexes are optionally merged into a smaller number of indexes, such as single relatively larger fixed index. Advantageously, this permits searches to be completed in relatively less time, as fewer indexes, and optionally only one index, needs to be searched. Search speed is much more closely correlated with the number of indexes that need to be searched, as compared to the size of the index, and therefore it takes less time to search one large file as compared to 5 or 10 other files that are in aggregate the same size as the one large file.

After a merge process is performed, new items are indexed and added to the corresponding bulk, and additional indexes are stored in non-volatile mass memory, as similarly described above. Generally, the first fixed index is significantly larger than the other fixed indexes, as the first fixed index is the merged composite of previous fixed indexes, while the additional fixed indexes are each one bulk in size.

In one embodiment, a fixed index can include a plurality of separate files, though in other embodiments, a single file containing the same or equivalent data can be used. For example, a "col" file stores attribute data for the target files corresponding to the index. As will be discussed below, the attributes can be used as search criteria and can be displayed to the user in column format. For example, with respect to email a user interface for searching emails can include a from (sender) attribute column, a to (addressee) attribute column, date/time sent and/or received attribute columns, a folder path attribute column, a client attribute column, a cc attribute column, a size attribute column, and a bcc attribute.

The fixed index can further include an "occur" file, which is the main inverted index data file. A "occur-offsets" file can also be generated. The occur-offsets file stores pointers into the "occur" file. The fixed index additionally includes a "words" file that comprises a list of the words that occur in the target files. Additionally there is a "deletions" file that lists indexed documents or files that have since been deleted. A "body" file can also be generated which has the document text. The body file content is used for view pane display when the actual document or document is not available or may become unavailable when the content is needed for display in the view pane. The body file can be particularly useful for more transient files, such as emails. The example bulk includes a words file, an occur file, and an occur offsets file.

Figure 2A:
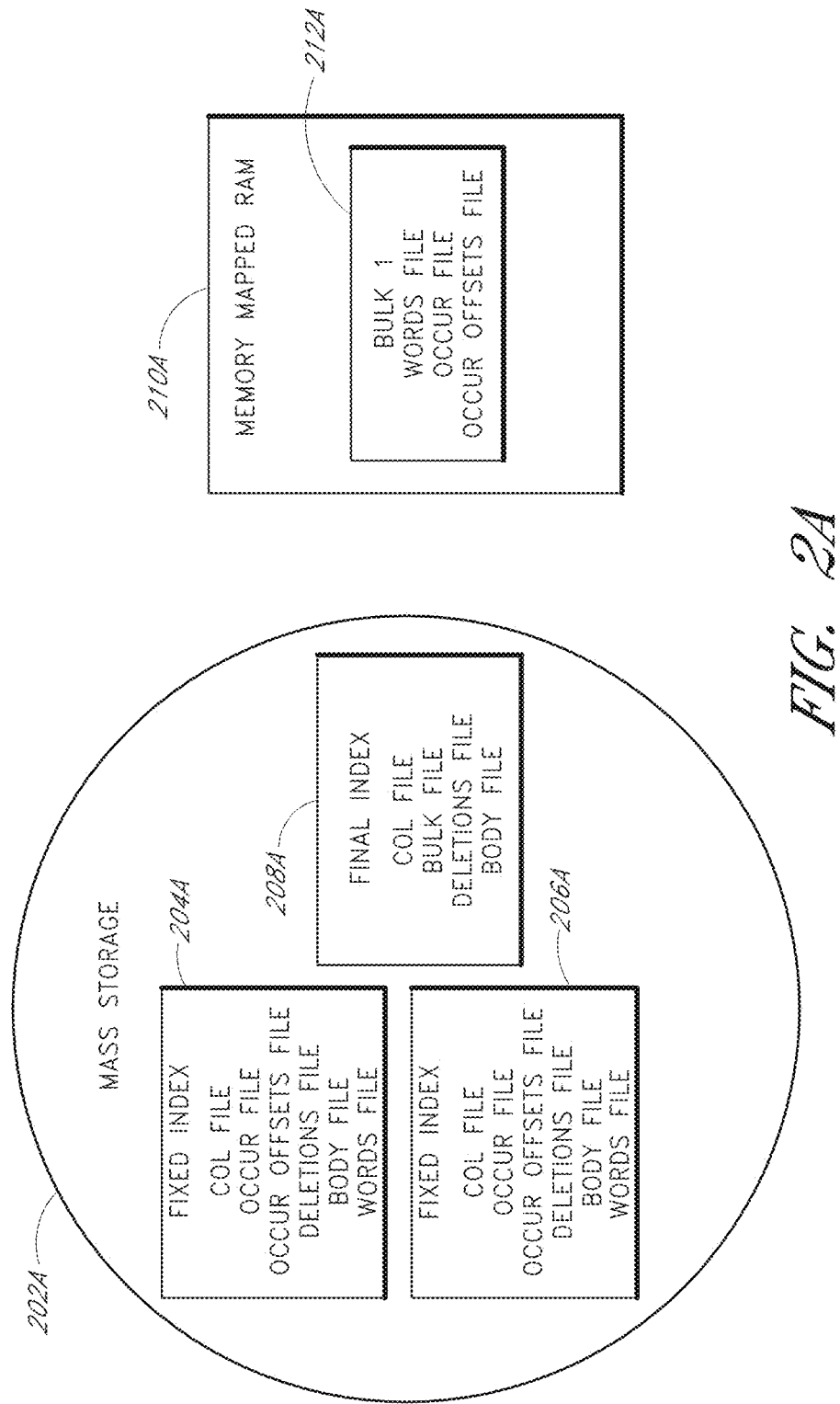
FIG. 2A illustrates an example index architecture.

FIG. 2A illustrates an example index configuration, though other index configurations, types and structures can be used in other embodiments. Each target type can be associated with its own corresponding set of fixed indexes and bulk. Advantageously, having separate sets of indexes for each target type, search and indexing can be performed faster. However, in other embodiments, the same index or index set can be used for all target types. The example index configuration illustrated in FIG. 2A includes three fixed indexes 204A, 206A, 208A stored on mass storage media 202A, which can be, for example a magnetic or optical disk drive. In this example, fixed index 204A is a merged index and is larger than indexes 206A, 208A which are non-merged index. Index 208A is the final index, that is, the index with the most recent additions and/or deletions. The final index 208A includes the information from the bulk 212A. The bulk 212A includes a words file, an occur file, and an occur offsets file. Advantageously, the bulk 212A is stored in RAM 210A so that additions and deletions can be made very quickly, without requiring constant modification of the final index 208A stored on slower mass storage media 204A. Optionally, all the indexes can be read into RAM 210A to increase search speed. Upon shut-down of the search application, the bulk 212A is written back to the index 208A for storage on the non-volatile mass memory media 204A.

Figure 2B:
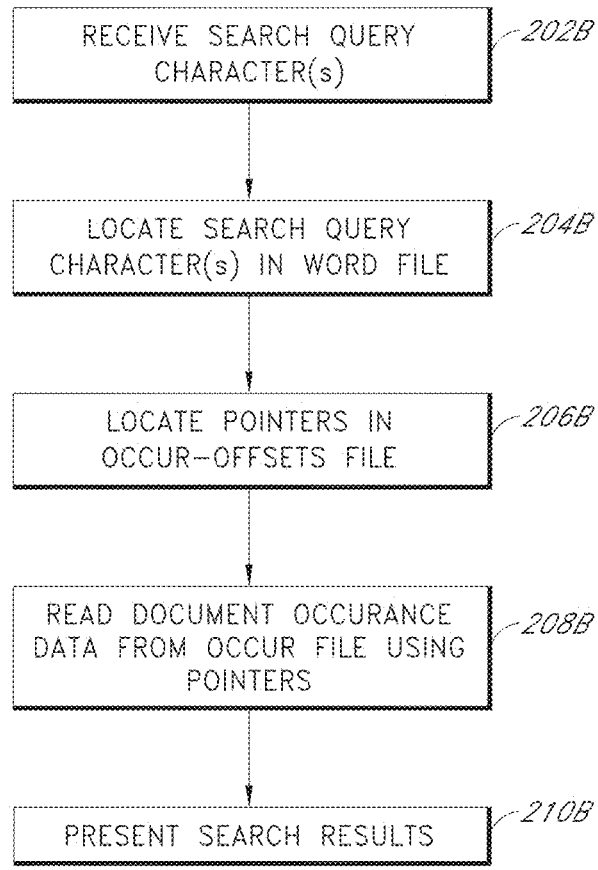
FIG. 2B illustrates an example search process using the index.

FIG. 2B illustrates an example search lookup operation. At state 202B one or more search characters or strings are received. At state 204B the character or character strings are located in the words file. At state 206B the pointer or pointers for the character or character strings in the occur-offsets file are located. At state 208B document-occurrence information is read from the occur file using the located pointers. At state 210B the search results are presented to the user. The search results are displayed in the list pane or area, and the view area or pane displays the contents of the first item or a selected item from the list area.

Optionally, the content displayed in the view area or pane is auto-scrolled down to the first matching character or character string, which may be highlighted or otherwise emphasized. The search term can be automatically displayed with multiple preceding and succeeding lines or sentences. For example, a search for "matisse" might find a document where the first appearance of "matisse" occurs at the $100^{th}$ line down. The auto-scroll process automatically scrolls down to, or otherwise displays the content beginning at a certain point relative to the first appearance of "matisse." For example, the content can be displayed in the view pane from line 90 to line 110, substantially immediately upon selecting that page in the list pane, so that the user can immediately see the matching word "matisse" in context. Optionally, the user can specify how many sentences or lines are to be displayed before and after the search term.

Optionally, the view area or pane displays the content in a collapsed format, so that several matches that are distributed throughout a viewed document can be seen at once, with one or more lines or sentences of context above and below each match displayed as well, and the remaining lines deleted or "collapsed" into " . . . " types of lines, with + symbols for expanding the collapsed section to view that section or the entire document in uncollapsed format, and with − symbols to recollapse a section as desired.

In one optional embodiment, the index stores "prefix" entries, which further enhances the speed of incremental filtering or searching. For example, in addition to bare or complete words, such as "dog," common prefixes, such as "d" or "do", are stored as well. The "d" prefix entry contains information indicating which documents or files contain a word or character string starting with "d". By preparing this information during indexing, the response for the first letter or two of a filtering or search operation is greatly enhanced as compared to a standard inverted index, which would have to locate thousands of matches at the time of receiving the user query, thereby resulting in slow filtering operations.

Optionally, a "sort" file is provided for each attribute column. The sort files are cached sort orders for the documents or files in the fixed index, when sorted by that column. In one embodiment, the sort order for each column is pre-computed before receiving a user sort instruction, so that when the user provides a sort order, such as by clicking on a column header to sort, the sort operation is performed almost instantly, in a few seconds or a fraction of a second, rather than in minutes. Optionally, the sort files can be cached in local RAM to speed up access of the sort files. The user can optionally specify that a particular attribute is to be used as a default sort key when presenting a document list. Thus, for example, the user can specify that as a default sort for email, emails should be automatically sorted and ordered according to date/time received. In this example, the pre-computed default sort list, also referred to as a master sort list, would then be sorted according to date/time, and the master sort list would be almost instantly presented with the pre-computed sort list when the user clicks on the email tab.

Optionally, a pre-computed sort list for a plurality of documents or files, or for every document or file in a selected search tab or interface is stored in high speed local memory RAM, sorted by the current sort order. The search engine can then search through this list when additional search terms are added. Advantageously, this enables the substantially instant redisplay of a given search result list in the selected order when the search results change as the result of a letter being typed or removed from the filtering phrase. Without the master sort list the incremental filtering might appear to operate much more slowly. In another embodiment, the column information is compressed so that all or a large portion of the column information fits in RAM. The column information can then be sorted using memory-sort algorithms, rather than pre-computing the sort order. In one example embodiment, the column information is compressed using a unique-string dictionary that includes each unique value that occurs in each attribute column file. The attribute column file contains pointers to items within this unique-string dictionary, rather than the strings themselves.

In one example embodiment, the pre-computed sort list is generated and used as follows. Referring to FIG. 2D, a sort process begins at state 202D, where a matching item list is retrieved or accessed from memory. At state 204D certain information in the matching item list is stored using a bit mask that optionally contains a bit for every item in a corresponding master sort list, that is for each indexed item for a given target type. The bit indicates whether the item in the master sort list is a matching item or not, that is, whether the item is included in the matching item list. For example, each bit can be set to either a "1" to indicate the item is a match, or a "0" to indicate no match. For example, if there are 1,000,000 indexed items in the master sort list, then the bit mask would use 1,000,000/8 bytes=125 k. Advantageously, use of the bit mask often significantly reduces that time it takes to locate matches as a quick bit-check operation can be performed on a given bit mask bit position, rather than necessitating a search through all or a large portion of the master sort list.

At state 206D the bit for an item in the bit mask is read to determine whether the master sort list item corresponding to the bit is a matching item or not. If the item is a matching item, the process proceeds to state 208D at which the item is added to the sorted list results and the process proceeds to state 210D. Otherwise, the process from state 206D to state 210D. At state 210D a determination is made as to whether the end of the master sort list has been reached. If not, the process proceeds back to state 206D and examines the next bit in the bit mask corresponding to the next item in the master sort list. If the end of the master sort list has been reached, the process proceeds from state 210D to state 212D.

In one embodiment, a bit mask is generated using the index file information. For example, there can be one bit per document, indicating which documents contain each word in the search phrase. Then Boolean operations (for example, AND, OR, NOT, XOR, etc.) can be used to combine the bit masks for some or all of the fixed indexes, and for some or all the different words or character string, to get a bit mask of the matching results.

Referring back to FIG. 1, the database or repository 105 may be configured as multiple files and/or databases stored on an internal or external storage device of the user terminal 104. A given index can include the item content, and the time, date, item size, or other attributes from when the index entry was created and/or last updated. The some or all of the foregoing index information can be used to determine if a file has been previously indexed or modified since it was last indexed, therefore needs to be indexed or re-indexed.

The search application 102 further includes a local search engine 107 that utilizes one or more of the indexes created by the index engine 103 to locate email, files, cached Web pages, databases and the like in response to a user query. For example, in response to a query the local search engine 107 accesses the index 105 and locates corresponding matches. The search engine 107 returns excerpts or headlines from relevant matches, and also returns links to the matches. In addition, the search application 102 optionally passes user queries to one or more remote search engines, receives the results, and displays the results to the user. In one embodiment, the search application 102 includes command line code that determines whether a user has entered a command into a search field, and if so, causes the command to be executed. While the search engine 107 and the index engine 103 are illustrated as separate entities, in one embodiment, they are combined in a single engine or module.

The search application 102 can be downloaded or accessed from a remote Web site, loaded via removable, optical, magnetic, or semiconductor memory, pre-loaded on the terminal's mass storage apparatus, or otherwise stored and/or made accessible to the terminal 104.

The terminal 104 can be a personal computer, an interactive television, a networkable programmable digital assistant, a computer networkable wireless phone, and the like, that optionally has access to the Internet via a network interface. The terminal 104 can include a display, keyboard, mouse, trackball, electronic pen, microphone (which can accept voice commands), other user interfaces, speakers, semiconductor, magnetic, and/or optical storage devices.

In addition to the search application 102, the user terminal 104 can run one or more commercially-available Web browser applications 106 such as Microsoft Internet Explorer® or Netscape Navigator®, which implement the basic World Wide Web standards such as HTTP and HTML.

The terminal 104 can also host and/or execute a commercially available e-mail application 109, such as Microsoft Outlook® which may be used to receive, send, and display emails. The e-mail application 109 and the browser 106 may be integrated with one another, and/or may be integrated with other application programs or the terminal operating system.

In the embodiment described herein, a Web site 108 hosts a remote search engine 110 executing on a computer system 111. The computer system 111 includes one or more content and index databases 112. The Web site 108 and search engine 110 are accessible to the search application 102 via the Internet 113. The Web site 108 may optionally include content that spans multiple Internet domains, and/or may be implemented using physical servers that are geographically remote from one another. In other embodiments, the Web site 108 may be in the form of an intranet site, in which case the terminal 104 may be coupled to the site by a private network. For example, Web site 108 may be in the form of an internal corporate store site for company employees.

In other embodiments, the Web site 108 may be replaced with another type of network site. For example, the various services described herein could alternatively be implemented on a hypertextual site or browsing area of an online services network such as America Online® or MSN®, in which case users may access the site using software that implements non-standard document formats and transfer protocols.

In addition, there can be several independent search engines associated with different Web sites, accessible to the terminal 104 via one or more computer networks.

As further depicted by FIG. 1, the Web site 108 includes a commercially-available Web server application 114. The Web server application 114 accesses databases used to generate Web pages in response to queries from end users, including queries submitted via the search application 102. In addition, the Web server application 114 can respond to the browser's request for a page, and deliver the page to the Web browser 106 through the Internet 113.

By way of example, the search engine 110 may search server-based databases, such as databases 112, of the full text of Web pages selected from selected Web pages. By way of example, the databases 112 can be generated using a spider or the like that "crawls" the Internet searching for Web pages, which are then stored in the databases 112, and that follow the links in those Web pages to other Web pages, which are then stored in the databases. Because the databases 112, or portions thereof, may have been generated before a user submits a search query, these databases may not be fully current. When the search engine 110 performs a Web search in response to a user query, the search engine returns excerpts from relevant Web pages as stored in a corresponding database, and also returns links to the current version of the Web pages, if such exists.

In addition, a Web page may be added to the search engine databases 112 by directly entering a URL. Optionally, the URL may be submitted by a user or someone associated with the URL. Once a Web page is stored, the Web page is then indexed by the index engine 113. The indexing process may include Web page text, links, and other content. The index is stored in or in association with the search engine database 112. When a user submit a query or search terms, the search engine 110 searches the index based on the query or search terms, including Boolean terms. The search engine 110 locates matches, and links to the corresponding Web pages are transmitted to the user terminal 104 for display. While the search engine 110 and the index engine 113 are illustrated as separate entities, in one embodiment, they are combined in a single engine or module.

Optionally, certain types of Web pages and links can be excluded from being indexed. For example, optionally a Web site owner can request that the Web site pages are not to be included in the search engine database.

Figure 3A:
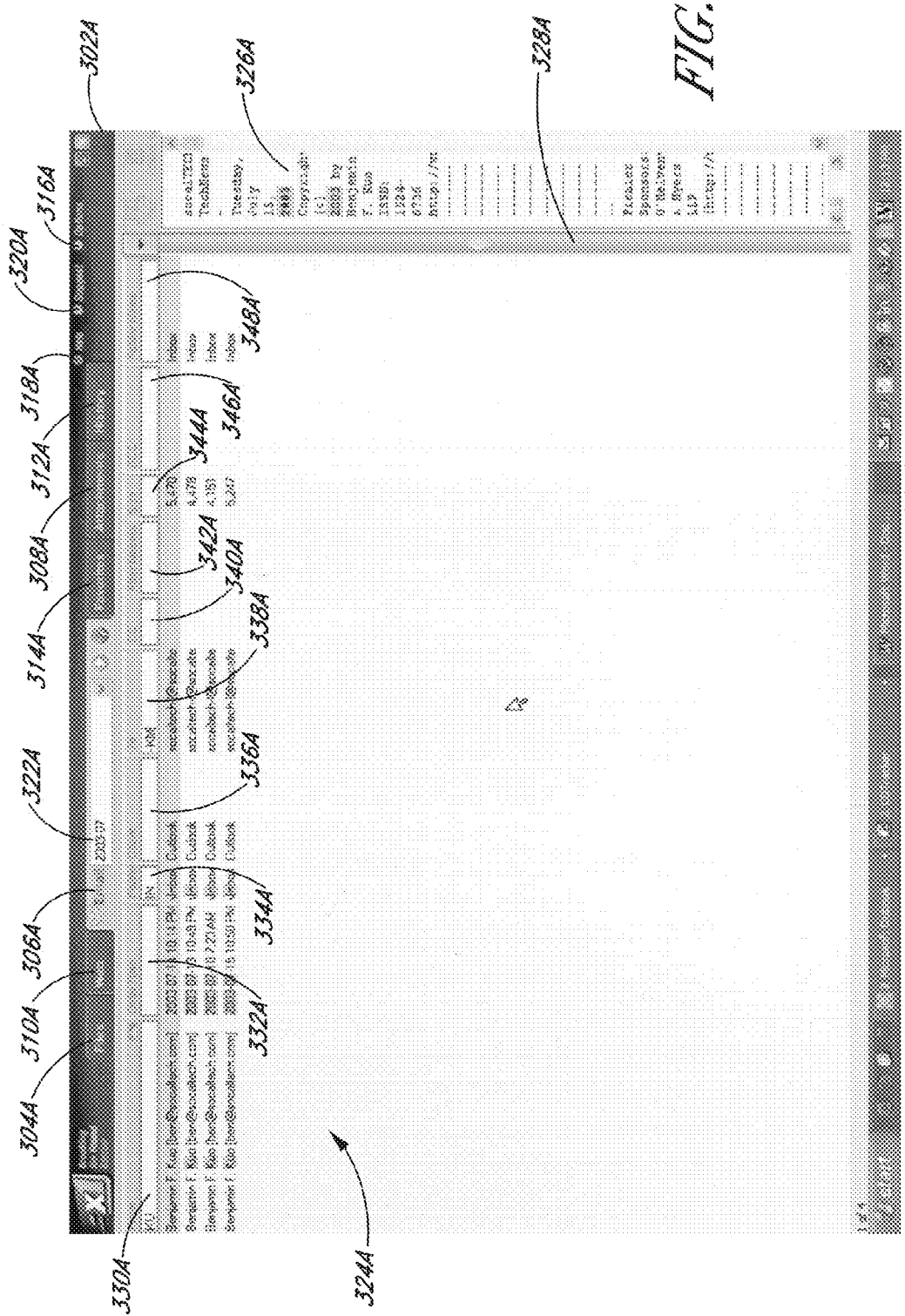
Figure 3B:
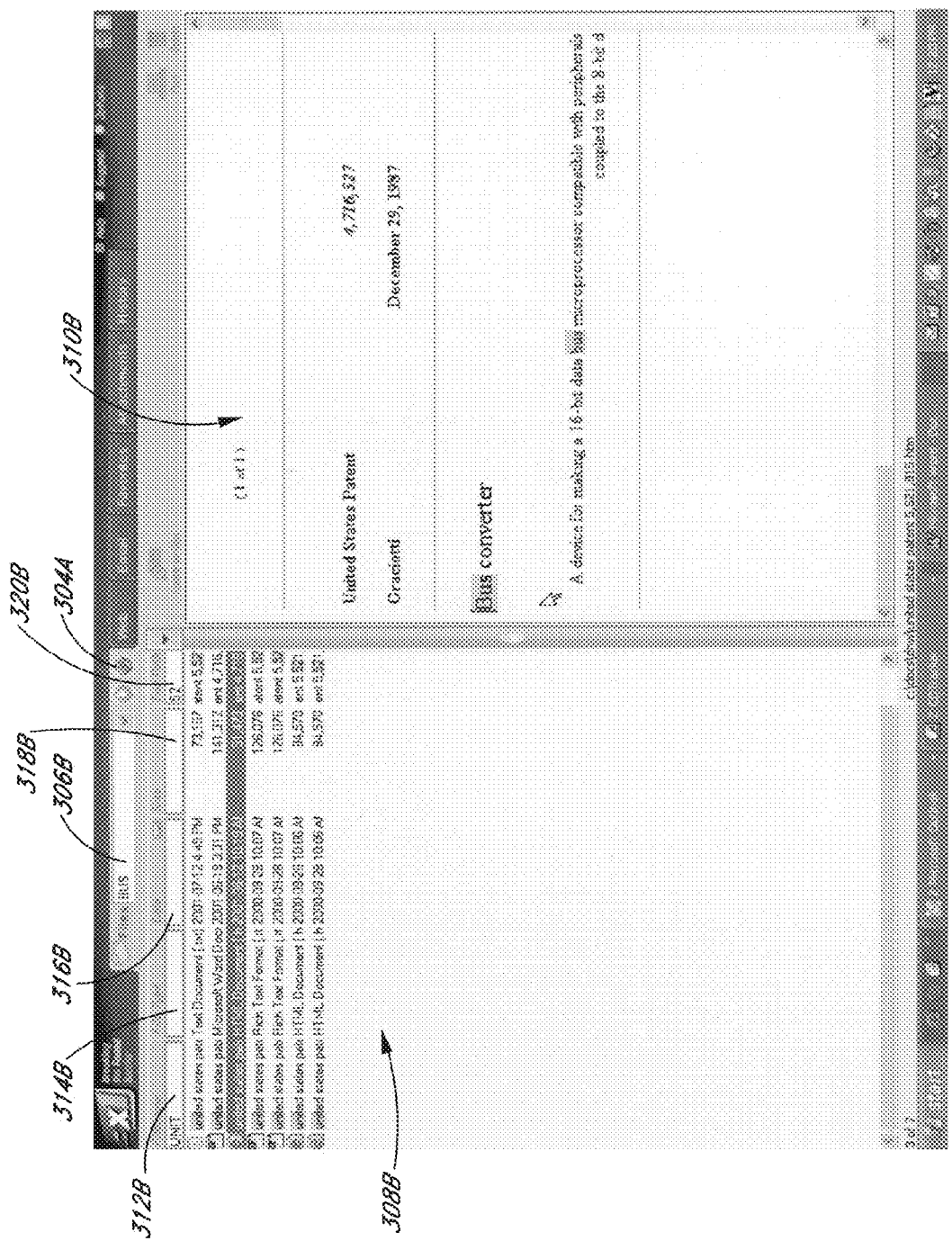
Figure 3C:
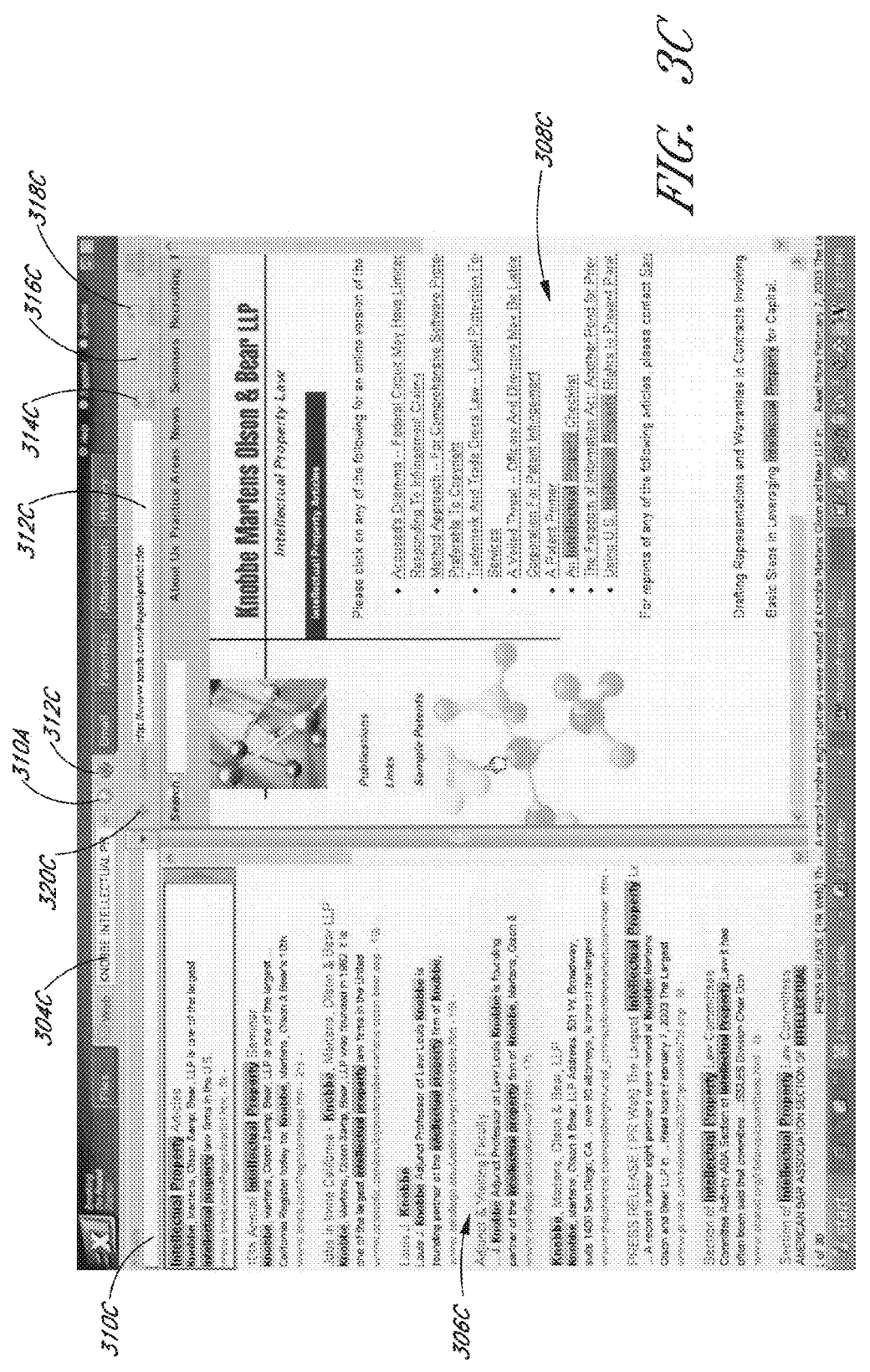
Figure 3F:
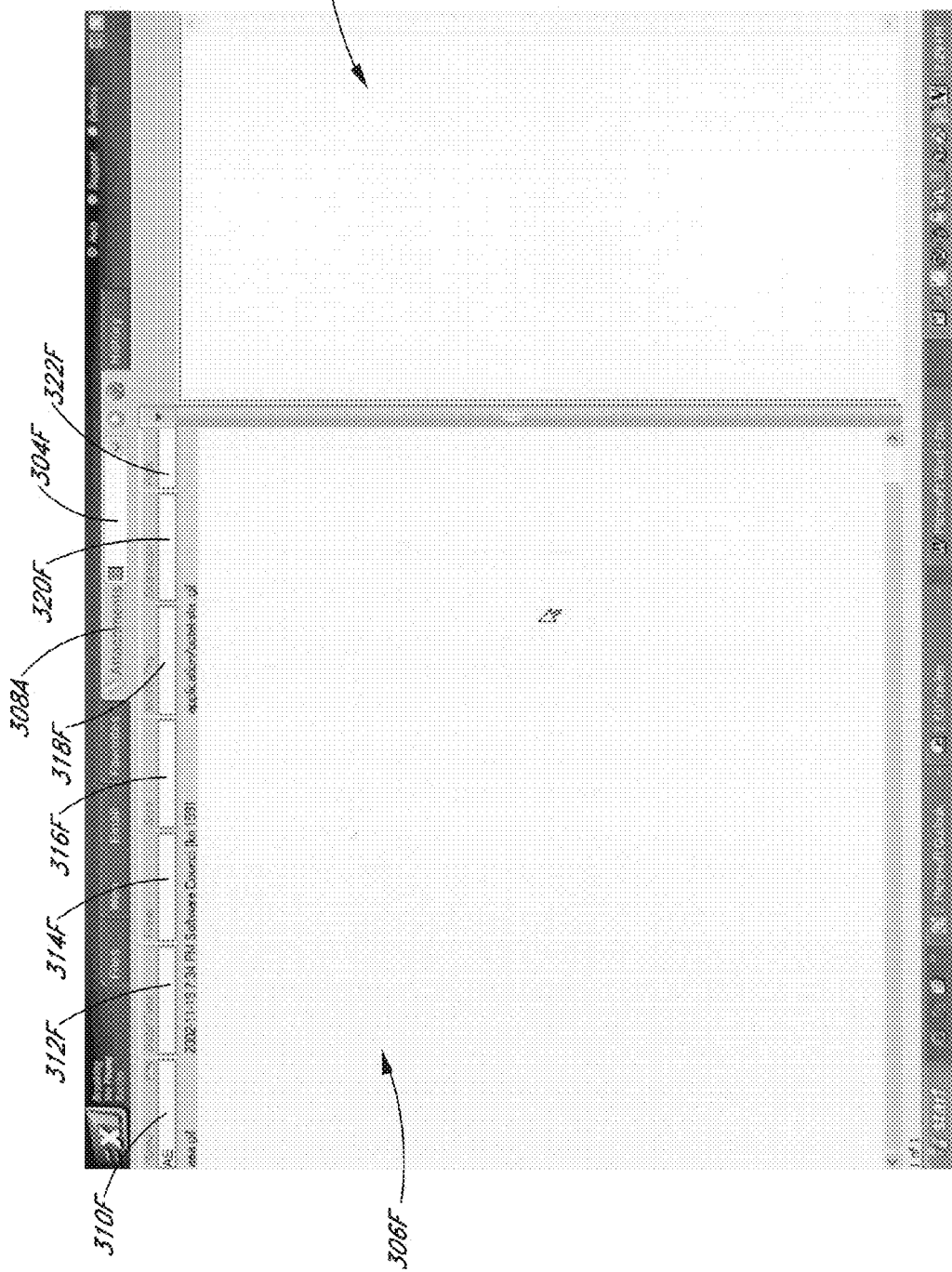

In addition the search application 102 includes a search application options form, via which the user can select the search application 102 to be configured in one of a docked mode, docked with auto-hide mode, and a "normal" Windows mode. If docked mode is selected, and assuming the search application 102 has been launched, a portion of the search application interface, such as a control bar, will constantly be visible at a fixed location of the user's display, such as on the top, left, right, or bottom of the user display. The control bar can include the search tabs discussed above, a main search field, a clear entry button, used to clear the main search field in response to a single click or activation, and a "go" button, used to initiate a search in those applications where the actual typing in of the search characters does not initiate the search. For example, when performing a search over the Internet, the user may optionally need to click on the go button to initiate the search. An example control bar is illustrated in FIG. 3I.

If the docked with auto-hide mode is selected, a portion of the search application interface will be at fixed location of the user's display, wherein the portion will visibly appear as a control bar when the user causes the cursor to point to the portion of the screen where the portion is docked for longer then a predetermined amount of time, such as 0.5 seconds. If the user moves the cursor off the control bar without performing a search, the control bar disappears, freeing screen space for use by other programs. If Windows mode is selected, the search application 102 operates as a conventional Windows program, wherein there is a non-docked, non-autohide window associated with the search application 102.

The option form also allows the user to set the search application 102 to start in email, files, Web, history, favorites, or database search mode.

Example search interfaces for different search targets, such as emails, files, the Web, and the like, will now be described. By way of example, the email search fields can include one or more of a content field, a from (sender) field, a to (addressee) field, date/time sent and/or received fields, a folder path field, a client field, a cc field, a size field, a bcc field, and a subject field. An example email search page or form is illustrated in FIG. 3A.

By way of further example, the file search fields can include one or more of a content field, a file name field, a file type field, a date field, a file size field, a path field, an author field, a subject field, and so on. An example files search page or form is illustrated in FIG. 3B.

By way of example, the history search fields can include one or more of a content field, a date/time (last viewed) field, a title field, a size field, a URL field, a format field, a category field, a domain field, a links field, a media type field, a language field, and/or a search term field. An example history search page or form is illustrated in FIG. 3D. The Internet search fields can include a content field, a URL field, a title or Web site name field, a size field, a date field, a format field, a category field, a site field, a links field, and a language field, and/or a media type field. The favorites search fields can include one or more of a content field, a URL or address field, a last refresh field, a title field, and/or the fields discussed above with respect to the Internet search fields. An example favorites search page or form is illustrated in FIG. 3E.

Example email attachment search fields can include one or more of a content field, a name field, a date/time field, a from field, a size field, a MIME tag field, an extension field, and/or path field. An example email attachment search page or form is illustrated in FIG. 3F.

Optionally, incremental indexing can be performed for files, emails, email attachments, Internet (or other network) search results, favorites, specific databases, and/or the like. Incremental indexing can be performed in direct response to a user command, continuously, periodically, and/or upon the occurrence of one or more specified conditions, generates and/or updates a corresponding index. For example, Web pages can be indexed as soon as they are stored or cached. Advantageously, incremental indexing can be used to provide consistently current search indexes.

For example, with respect to emails an email index can be incrementally updated upon the receipt of new emails, at a specified recurring period (for example, every 60 seconds), at one or more specific times during the day, or when the host computer system is idle. In one embodiment, the host computer system is considered idle when one or more of the following conditions are met: when central processor usage falls below a first threshold; when the host computer bus utilization falls below a second threshold, when a user interface device, such as a keyboard, has not been activated for a first period of time. In other embodiments, different criteria can be used to determine with a computer system is idle. In addition, the user can manually specify that indexing of new email shall be immediately performed, or that all email should be re-indexed.

By way of further example, with respect to files, a files index can be updated upon the creation, editing, or saving of a file, at a specified recurring period (for example, every 60 seconds), at one or more specific times during the day, or when the host computer system is idle. In addition, the user can manually specify that indexing of new files shall be immediately performed, or that all files should be re-indexed. An example files incremental indexing options form is illustrated in FIG. 3J. Advantageously, the user can optionally specify different indexing trigger conditions for different target types, such as for email and files. In one embodiment, the user can optionally specify different indexing trigger conditions for history, favorites, and attachments as well. Optionally, a server hosting a database can be configured to notify the search application of database changes, and the search application's index engine can index the changes substantially immediately after such notification.

Advantageously, an embodiment of the search application 102 can be customized by a user to meet the user's particular needs or preferences. For example, the user can select which email application or applications the email search is to be performed in conjunction with. For example, the user can select Microsoft Outlook®, Outlook Express, Netscape® Mail, Eudora® and/or other email applications. In addition, in one embodiment, the user can select one or more Internet search engines to be used in performing a search. As described above, the search engines can be executed by the host computer, or by a remote server. For example, in one embodiment the user can specify the Internet or other network searches are to be performed using one or more of Google™, Teoma™, and AltaVista® search engines.

With respect to Internet, email, file, or other searches, the user can optionally specify that only search results that are likely to be relevant are to be displayed. For example, if the user requests that only search results that are likely to be relevant are to be displayed, then only the higher ranked search results are displayed to the user. For example, only the top 20, 50, 100, 500, or 1000 search results may be displayed. Relevancy can be determine using one or more techniques, such as whether an exact match is found for the search terms, how many times the search terms are found in a document, the spacing of search terms in a document from each other, Optionally, the relevancy of each found document or file is scored, and the score for one or more of the files or documents are displayed to the user adjacent to the corresponding search results.

In addition, the user can optionally specify which local and/or network folders are to be indexed. Further, the user can optionally specify, on a global or file-by-file basis, that the file contents and all attributes are to be indexed, or only specified attributes, such as file name and/or size, are to be indexed. The user can also specify, on a global or file-by-file basis, that only certain types of files, or files with certain extensions, are to be indexed. For example, a user can specify that only .txt, .doc, .avi, .pdf., and .mpg are to be indexed.

Figure 2C:
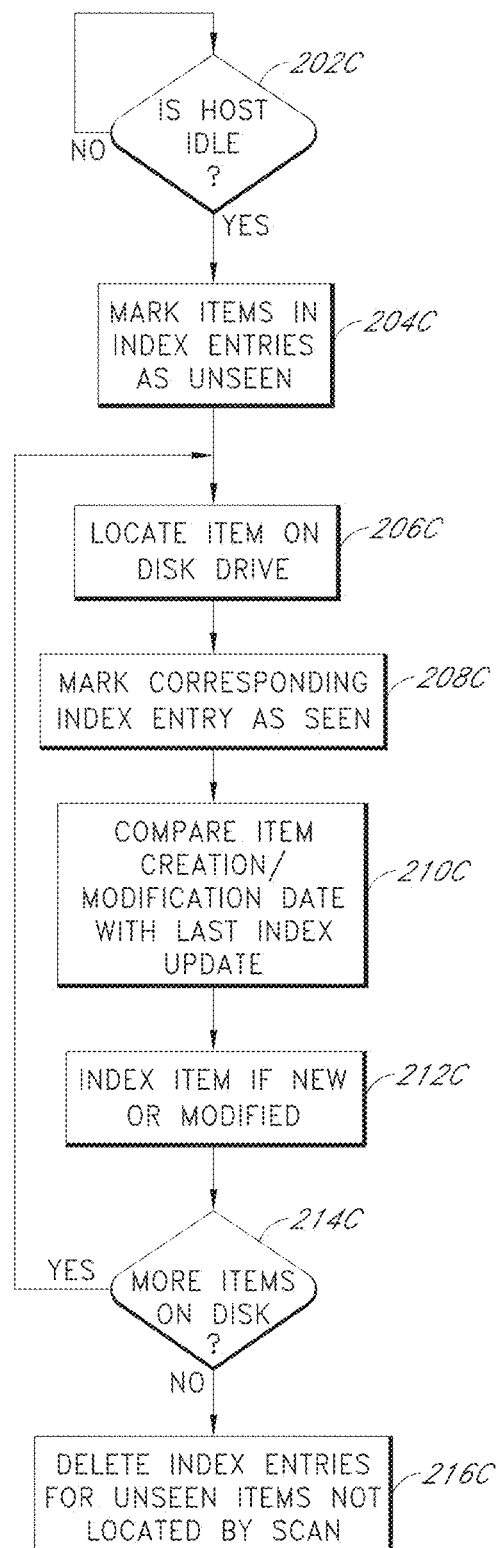
FIG. 2C illustrates an example indexing process.
Figure 2D:
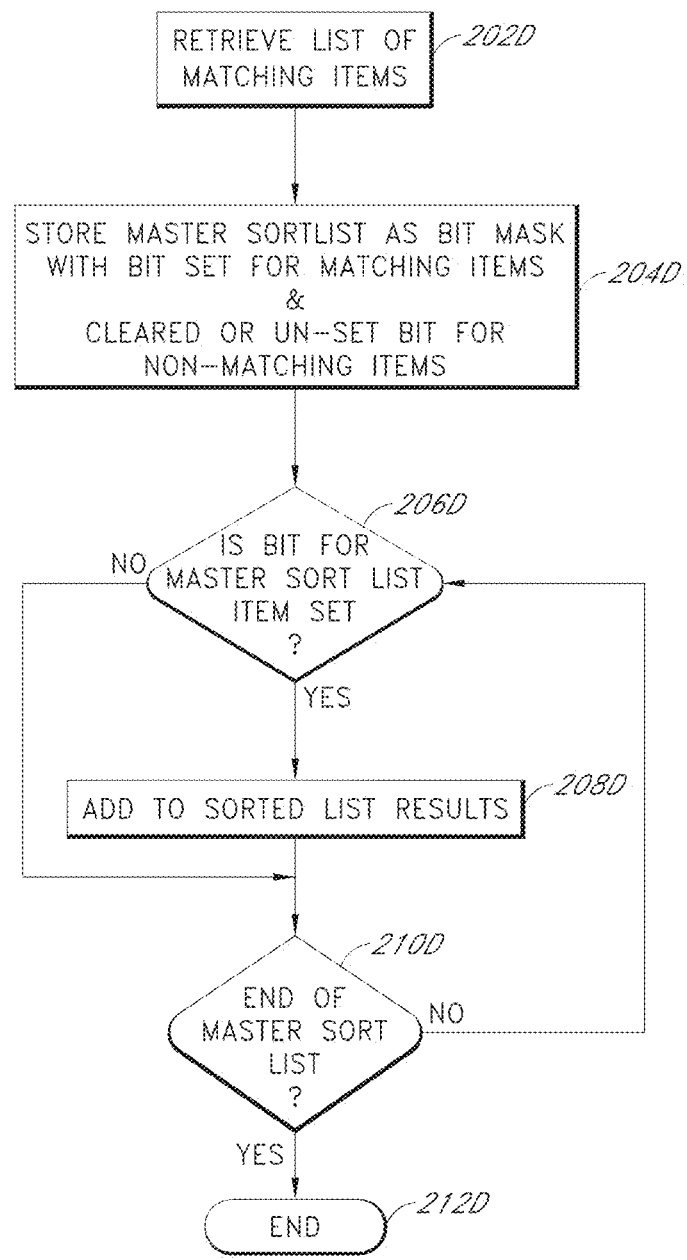
FIG. 2D illustrates an example use of a pre-computed sort list.

FIG. 2C illustrates an example indexing process for a given target that can be performed using the indexing/scanning module. As discussed above, the target can be a document, email, file, Web pages, or the like. Optionally, the user can specify that one or more of the following are to be included in the history index and/or search: Web pages located using the Web search interface corresponding to Web tab 310A, Web pages corresponding to the user's favorites, Web pages directly addressed using the address fields on any of the search interfaces, Web pages accessed via a separate browser, such as Microsoft Explorer.

In this example, the user has specified that indexing is to be performed when the host computer is idle. Beginning at state 202C, an indexing/scanning module determines if the host computer is idle. If the host computer is idle, the process proceeds to state 204C, where the scan process begins. At state 204C index item entries are marked, via a bit or flag associated with a given item, as unseen. As will be discussed below, the "unseen" bit is used to determine if a given item has been deleted and so is to be removed from the index. At state 206C a first item located in an appropriate directory on the mass storage device, which can be a disk drive, is located. At state 208C, because the first item was located, the corresponding index entry is now marked as seen by setting the corresponding flag or bit.

At state 210C the modification date and time, and/or creation date and time, of a given item is compared to the date and time the index was created or last updated to determine if the file needs to be indexed or re-indexed. For, example, if a file has been modified or created since the last time the index was updated, then those files are to be indexed.

Optionally, for email files and/or other file types, the indexing/scanning module generates its own "change ID" for each appropriate file. For example, for emails the change ID is generated based on email characteristics or attributes, such as subject, sender name, and/or date. By way of example, and not limitation, the change ID ("uid") can be an aggregate of two or more of the receive time, size, subject, and sender name, as well as the containing folder id, and message-store ID as follows.

uid=entryid+'|'+fullpathtocontainingfolder+'|'+folderid+ '|'+storeid '|'+client.
  entryid:
    for the Outlook client, entryid=the MAPI entryid.
    for other clients, entryid=the "message id" that can be found in the email headers,
    and if that's not present, entryid is generated as follows: entryid=receiveddata+'|'+size+'|'+subject+'|'+sender-name
  folderid:
    for Outlook, folderid=the MAPI entryid of the containing folder
    for OE (Outlook Express), use an id from its store
    for other email clients, use the full path to containing folder
  storeid:
    for Outlook, storeid=the MAPI store id of the containing message store
    for other clients, storeid is an empty string.

When performing state 210C during a scan operation, the index module examines the previously calculated change ID for each document or file, generates a new change ID for the documents or files, and compares the previous and new change IDs. If the change IDs are different for a file, then that file will be re-indexed.

At state 212C, the new and/or modified item indexed or re-indexed. At state 214C a determination is made as to whether there are additional items in the appropriate disk directories. If there are, the process proceeds from state 214C to state 206C, where the index process is repeated for the next item. Once all items have been indexed, the process proceeds to 216C. The index item entries are examined to determine if any of the entries are still designated as unseen, indicating that the item was not found during the scan and index process. If the item is designated as unseen then it is inferred that the item has been deleted, and those unseen items are deleted from the index.

As illustrated in FIG. 3A, one example search application interface includes a control bar 302A, including search mode tabs for files 304A, email 306A, email attachments 308A, the Internet World Wide Web ("Web") 310A, prior Web search results ("History") 312A, and favorites 314A. There is also an options button 316A that, if selected, provides the user with a variety of forms that allow the user to customize the search application 102 in accordance with the user's preferences and needs. In addition, there is a help button 318A, and a suggestion button 320A, which can be activated when the user wants to submit a suggestion regarding the search application 102 or improvements thereto. Advantageously, having the suggestion button 320A located on a main interface makes it more likely users will provide helpful suggestions, as compared to having such a suggestion button located on a buried menu or rarely accessed interface.

The tabbed interfaces can have a main search field 322A, wherein the user can enter a search string of one or more alphanumeric characters. The main search field is used to search for a string corresponding to one or more of the search fields associated with the search mode, and optionally other attributes. Thus, for example, with respect to the email tab 306A, the search application 102 will incrementally search for the main search field string in the email contents, from (sender) field, to (addressee) field, date/time sent or received fields, folder path field, client field, cc field, size field, and bcc field.

As illustrated in FIG. 3A, the search results are displayed in a list area or pane 324A, which includes a list of the search results, including relevant attributes in column format. In the example illustrated in FIG. 3A, the attributes include a from (sender) attribute column, a to (addressee) attribute column, date/time sent and/or received attribute columns, a folder path attribute column, a client attribute column, a cc attribute column, a size attribute column, a bcc attribute column, and a subject field. In this example, each of the columns has a corresponding search field 330A-348A.

In addition, a view area or pane 326A is provided that displays the content of the first item or user-selected item from the list pane or area 324A. The user can print the search results displayed in the list pane or area 324A, as well as the document, email, Web page, file, and the like, displayed in the view pane or area 324A.

Further, when the user clicks on a list pane entry, the corresponding contents are displayed in the view pane 326A. If the user double-clicks, or presses the Enter button, on the list pane entry, the search application causes the entry to launch in its native application. For example, if the user double-clicks on a list pane entry corresponding to a Word file, the file will open in Word. Similarly, if the user double-clicks on a Web page entry in the list pane 324A, the Web page will open in the user's default browser. If the user double-clicks an email entry, the email will open in the user's default email application, such as Microsoft Outlook®.

The user can also open the folder containing a file listed in the list pane by right-clicking on the file name in the list area 324A and selecting "View Folder". Similarly, the user can open the folder containing an email listed in the list area 324A by right-clicking on the email name in the list pane and selecting "Locate On Disk". The user can right-click to mark email listed in the list area 324A as read or unread by using the corresponding "mark read" or "mark unread" buttons at the top of the view area 326A. Further, the user can activate the plus and minus keys (+/−) to move from one highlighted search term to the next (or previous) in the view area 326A.

In one embodiment, the user can adjust the width of the list and view areas or panes 324A, 326A by dragging a divider bar 328A located between them to the left or right. In addition, rather than having the list and view areas 324A, 326A visually joined, the list and view areas 324A, 326A can optionally float separately from one another, and the user can separately drag the areas as desired on the user's display device. The user can move up, down, and between the list and view panes 324A, 326A using appropriate controls, such as, by of example, up, down, left, right arrow buttons, the tab button, and/or the PgUp (page up) and PgDn (page down) buttons.

In addition, the user can adjust the column widths in the list pane or area 324A by dragging a corresponding column side. Further, the user can reorder the column placement by grabbing a corresponding column header, using, for example, the left mouse button, and then dragging the column to a new location. Optionally, the user can also delete columns. The user can cause the system to reverse a search sort order by clicking on a user selected column header.

Example searches will now be described. The searches can be performed using an index, such as that illustrated in FIG. 2A, and using the search process as similarly described above with respect to FIG. 2B.

Figure 4A:
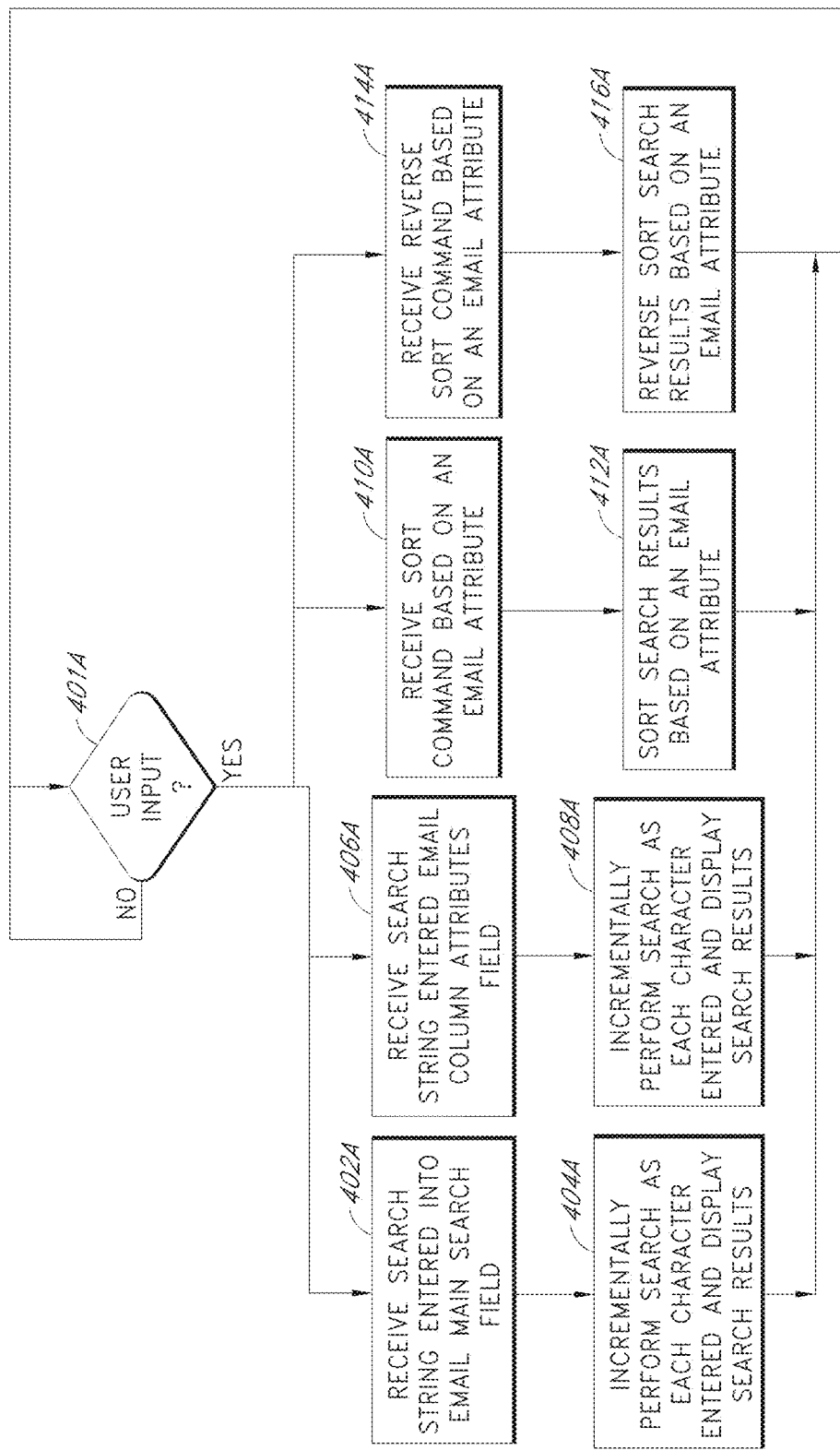
FIGS. 4A-4F illustrate example search processes.

By way of example, in order to perform an email search, a user can click on the email tab 306A and bring up the email search interface page, illustrated in FIG. 3A. As illustrated in FIG. 4A, at state 401A the search system waits for a user input. The user input can be, for example, a search character string or strings entered into the main search field 322A, a search character string or strings entered into an attribute search field, a sort command, or an inverse sort command. The search character or strings can include one or more alpha characters, numeric characters, words and/or phrases that appear in the email contents, from (addresser) field, to (addressee) field, date/time sent or received fields, folder path field, client field, cc field, size field, a bcc field, and a subject field of the email(s), that the user is searching for.

If the user has entered one or more characters or strings into the main search field 322A the process proceeds to state 402A where the search string is received. The characters or strings can be typed in one at a time by the user or a string or strings of multiple characters can be pasted in with a paste operation. Proceeding to state 404A, a search is incrementally performed using each entered character by the search application's local search engine, and the list pane or area 324A displays incrementally narrowed down search results. Thus, states 402A and 404A take place at almost the same time. For example, state 404A may take place a fraction of a second or a very few seconds after state 402A. Similarly, a user can incrementally broaden the search results by deleting or backspacing over previously entered search characters. The search results are broadened substantially immediately in response to the user deleting or back spacing over a character, without requiring that the user click on or otherwise activate a "search" button or the like.

If the user entered one or more characters or strings into one or more corresponding column fields 330A-348A the process proceeds from state 401A to state 406A where the search characters or strings are received. For example, if the user is looking for an email that was received in April of 2003, the user can enter "2003-04" or a portion thereof into the date/time field 332A. At state 408A, as the user enters characters into a column search field, the search is further incrementally performed by the search application's local search engine, and the list pane or area 324A displays incrementally narrowed down search results. Thus, the user can enter or delete search terms in the search fields above each of the attribute data columns to incrementally limit or broaden the results based on matches in that column for the search term entered. The search is performed using the email index, including bulk and fixed indexes.

The user can optionally select a highlight process, wherein search terms will be highlighted in the list pane or area search results and/or in the view pane or area content display. The highlighting can be in the form of a different coloring, the use of different fonts, blinking text, and/or the like.

At state 410A, by clicking on an appropriate column header, the user can command the system to sort the search results based on a selected column. For example, the user can click on the Size header to sort the results based on size. The sort can have been pre-computed as similarly described above so that the sort can be immediately displayed. At state 412 the search results are accordingly sorted. In one embodiment, the default sort orders displays the smallest size email first and the largest size email last.

At state 414A, clicking on the column header a second time reverses the sort order displayed to the user. For example, if the user believes that the email being searched for is large in size, the user can click on the Size column header so that the larger files are displayed at the top of the column.

Figure 3G:
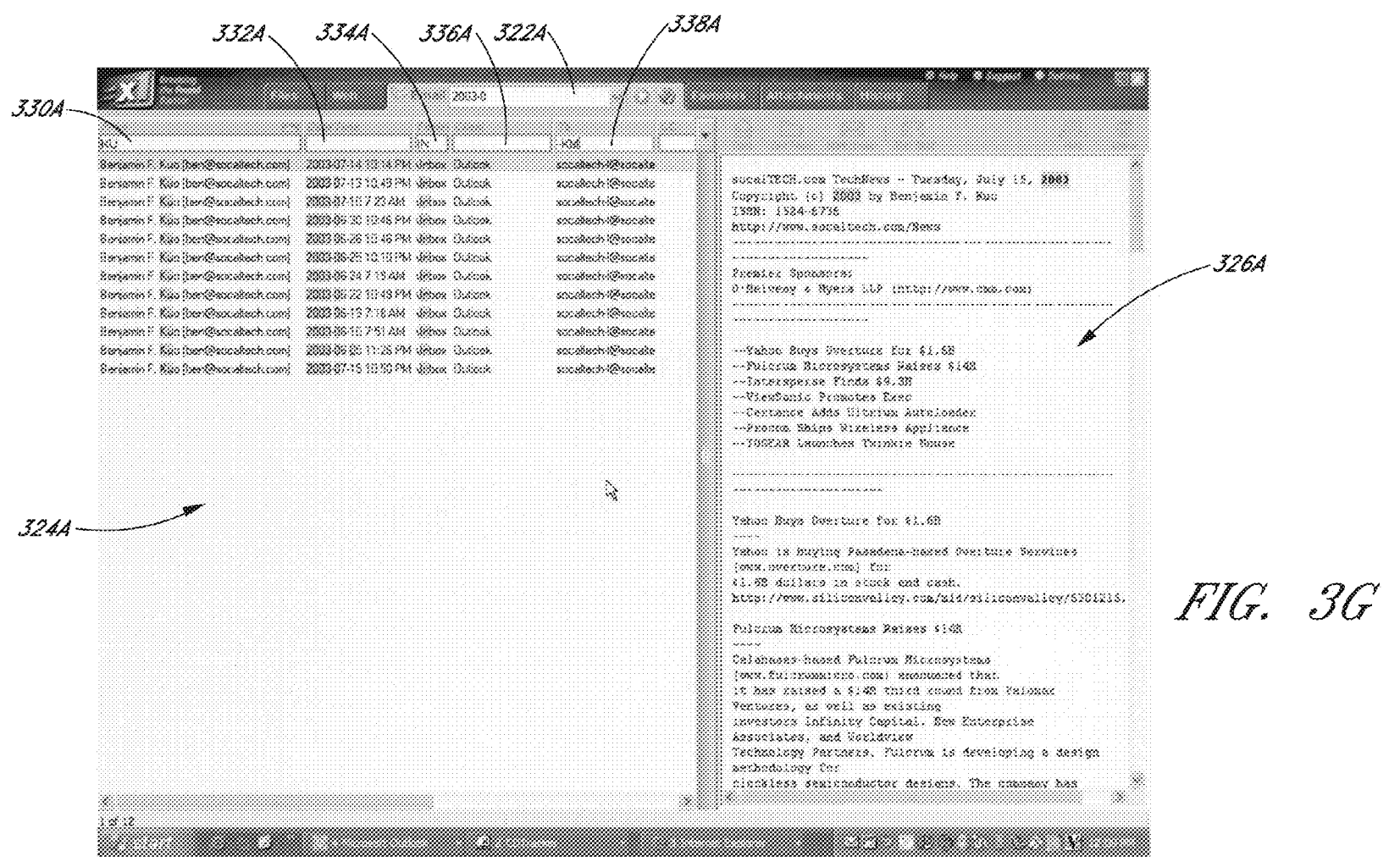
Figure 3H:
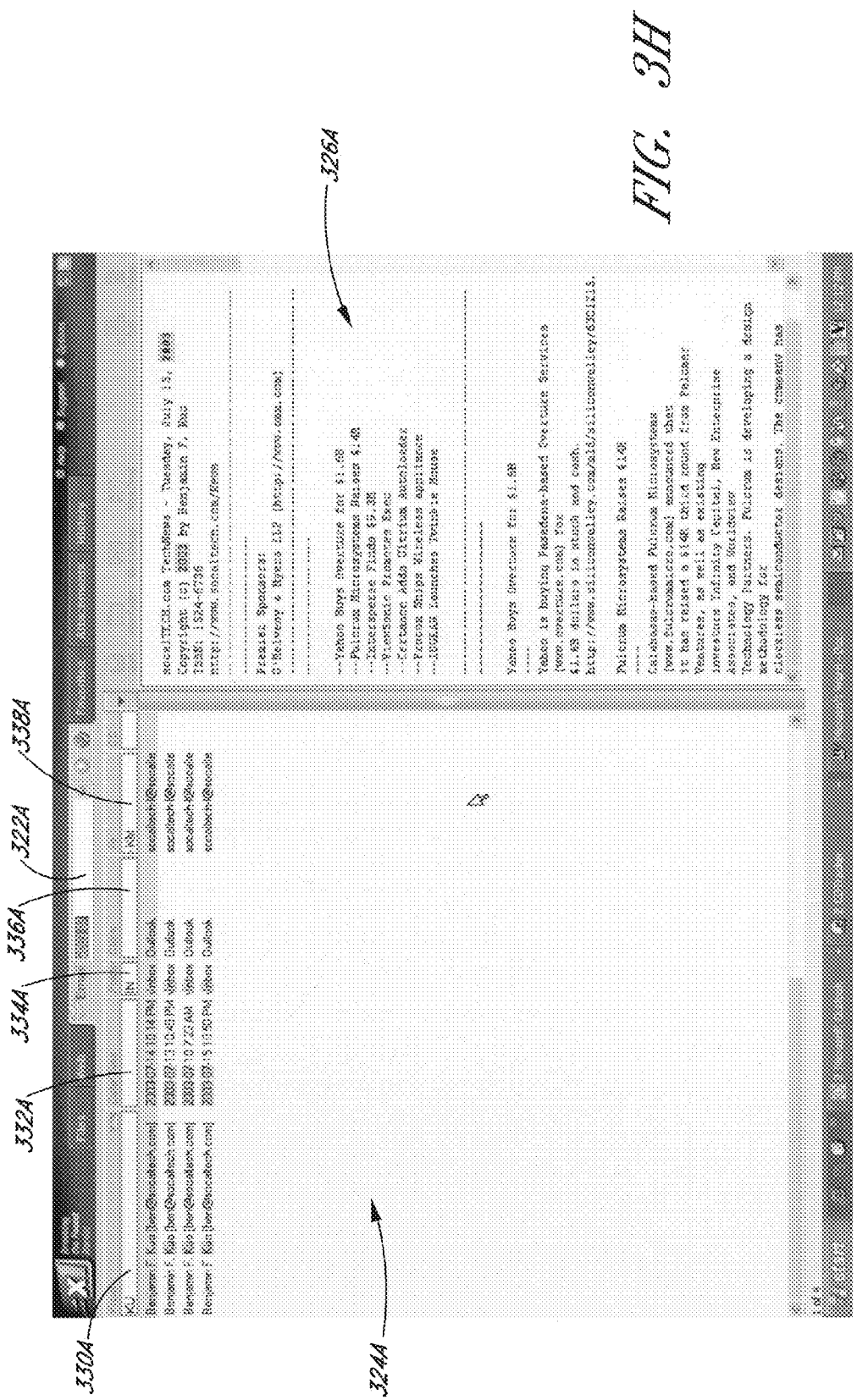
Figure 3I:
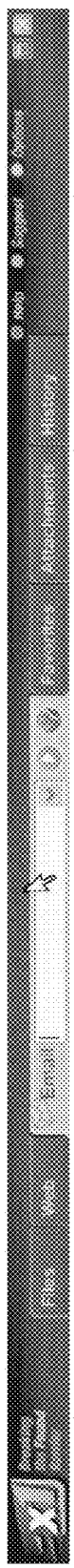

FIGS. 3G-H illustrate the email search interface during two different stages of an incremental search. The main search field 322A has the character string "2003-0" entered, the from field 330A has the character string "KU" entered, and folder field 334A has the character string "IN" entered, and the to field 338A has the character string "KM" entered with the NOT argument (−) preceding it. The search engine has narrowed the emails listed in list pane or area 324A to the twelve that have the character string "2003-0" in any of the emails' attributes or content, have "KU" in the from field, are located in a folder having the character string "IN" in the folder name, and that does not have the character string "KM" in the to field. The character strings are identically entered in FIG. 3H, except the character string ("2003-07") entered in the main search field 322A now has one additional search character (a "7"). Substantially immediately after the "7" was entered, the search application incrementally narrowed the number of emails listed in the list pane 324A from the twelve illustrated in FIG. 3G to the four emails listed in FIG. 3H.

Figure 4B:
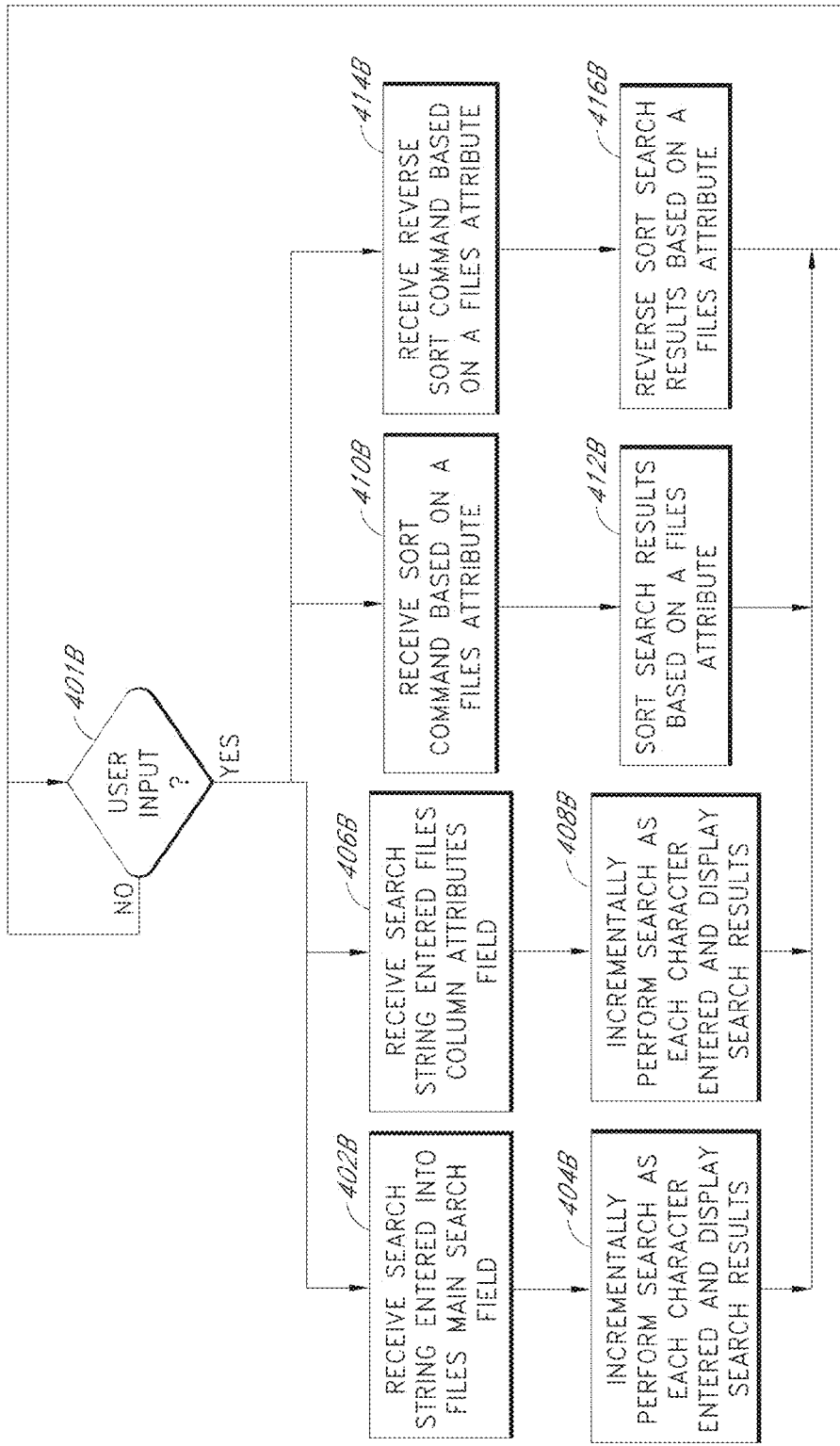

By way of further example, in order to perform a file search, a user can click on the file tab 304A and bring up the files search interface page, illustrated in FIG. 3B. As illustrated in FIG. 4B at state 401B the search system waits for a user input. The user input can be, for example, a search character string or strings entered into the main search field 322A, a search character string or strings entered into an attribute search field, a sort command, or an inverse sort command. If the user entered search characters or strings into the main file search field 306B, the entry is received at state 402B. For example, the entry can include one or more of alpha characters, numeric characters, words and/or phrases that appear in the file contents, the file name, the file type, the file modification date field, the file size, or the file path. At state 404B, as the user enters characters into the main search field the search is incrementally performed by the search application's local search engine, and the list pane or area 308B displays incrementally narrowed down search results.

If the user has entered one or more characters or strings into one or more corresponding column attribute fields the process proceeds from state 401B to state 406B where the search characters or strings are received. For example, the user can provide a relevant string of characters in a corresponding column attributes field, such as a file name field 312B, a file type field 314B, a date field 316B, a file size field 318B, and a path field 320B. By way of example, if the user is looking for a document located in a "Documents" file on the user's computer "C" drive, the user can enter "C: Documents" or a portion thereof in the path field 320B. At state 408B, as the user enters characters into a column search field, the search is further incrementally performed by the search application's search engine, and the list pane or area 308B displays incrementally narrowed down search results. The search is performed using the file index, including corresponding bulk and fixed indexes.

At states 410B, 412B by clicking on an appropriate column header, the user can command the system to sort the search results based on a selected column. For example, the user can click on the Size header to sort the results based on size. In one embodiment, the default sort order displays the smallest size file first, and the largest size file last. At states 414B, 416B clicking on the column header a second time reverses the sort order displayed to the user. As discussed above, the search terms can optionally be highlighted in either or both the list pane or area 308B and the view pane or area 310B.

Figure 4C:
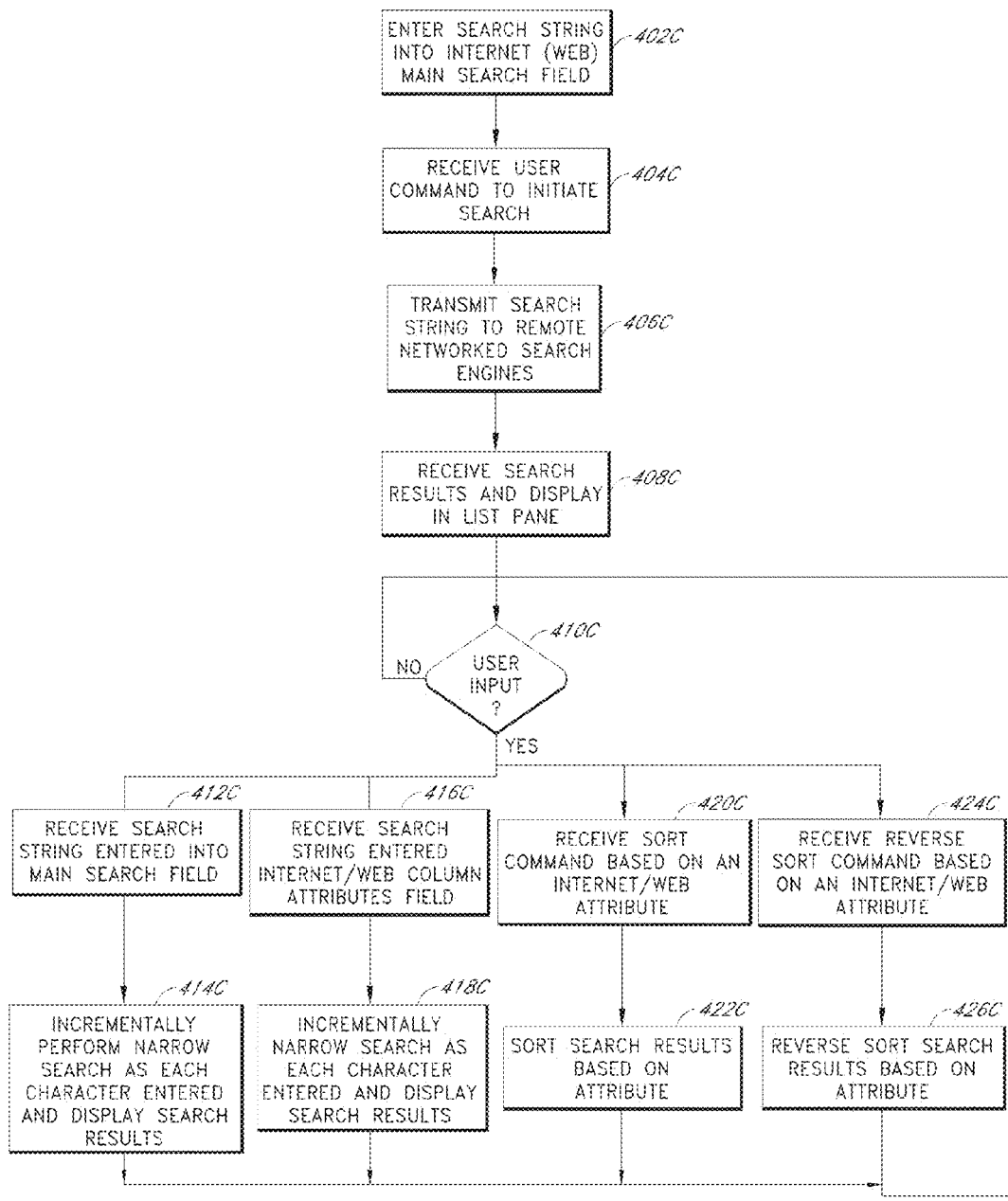

When searching the Internet and/or Web sites, a user can click on the Web site tab and bring up the Web search interface page, illustrated in FIG. 3C. As illustrated in FIG. 4C, at state 402C, the user enter a search query into a main search field 304C, including alpha characters, numeric characters, words and/or phrases that the user wants to search for in the Web site contents, the Web site name, and/or the Web site URL. At state 404C, the user initiates the search, such as by activating the "Go" button or pressing the Enter button and the initiation command is received by the search application.

At state 406C, the query is transmitted over a network, such as the Internet, to one or more search engines, such as Google™, Teoma™, and AltaVista®, which perform searches in parallel based at least in part on the user entry. At state 408C, the search results from the one or more search engines are returned to the search application, and the search results are displayed in the list area or pane 306C and the Web page contents of a selected or highest ranked search result is displayed in the view pane or area 308C. Optionally, some or all of the Web pages corresponding to the search results are pre-cached on the user's terminal 104 or on other storage local to the user. For example, the Web pages of the first twenty (or other predetermined quantity) listed search results can be pre-cached. In one embodiment, the maximum number of pre-cached Web pages corresponding to the search results is set to be equal to the number of search results that can be displayed in the list pane.

At state 410C the search system waits for a user input. The user input can be, for example, a search character string entered into the main search field, a search character string entered into an attribute search field, a sort command, or an inverse sort command. If the user entered search characters or strings into the main file search field, the entry is received at state 412C. At state 414C, as the user enters characters into the main search field the search is incrementally performed by the search application's local search engine, and the list pane or area 308B displays incrementally narrowed down search results.

At state 416C, the user can narrow the search results displayed by entering a relevant string of characters in a corresponding column attributes field. The illustrated example includes a "results" column field 310C that can be used to search for all indexed attributes and/or content. Other embodiments can include additional or different columns and fields, such as a URL column and field, a title or Web site name column and field, a size column and field, a date column and field, a format column and fields, a category column and field, a site column and field, a links column and field, and a language column and field, a media type column and field corresponding to the type of media used on the page, and/or the like.

The format field and column are used to search for and categorize pages according to the page or document type and/or extension. For example, the format can be a Word document (.doc), an Acrobat document (.pdf), or a PowerPoint document (.ppt). The site field and column are used to search for and categorize pages according to a Web sites top-level domain name (for example, www.zzzzzzz.com).

The category field and column are used to search for and categorize pages according to their genre or type, which can have descriptive labels such as "hubs", "personal home page", "commercial", and/or the like. The search system can examine certain Web page and site characteristics during the crawling of the Internet or thereafter, and based at least in part on those characteristics, identify the Web page as belonging to one or more categories. If the categorization is performed before a user requests a search, a user search request, including a category term, can be performed much faster than if the categorization was performed at the time of, or in response to the user search request.

For example, the category "hubs" or "directory" can correspond to Web pages that have many different links to other Web pages. In addition to the quantity of links, the quality of links can also be taken into account by the search system in categorizing a Web page as a hub or directory. The quality of the links can be scored based on a variety of parameters, including the number of different domains the links link to, how many links are alive or broken (a broken link is a hyperlink that does not work), and/or other parameters. Thus, for example, in one embodiment, the higher the number of different domains the links link to and/or the greater the number or percentage of alive links, the higher the quality score. If the score exceeds a predetermined threshold, the search system will categorize the page as a hub page.

With respect to the "personal home page" category, by way of example, the search system can look for certain key words or phrases, such a "family," "children," and/or "personal home page." In addition, the search system can determine how many pictures or JPEG files are on the page, and the level of sophistication of the HTML or other formatting code used to create the page. Thus, for example, based on the number of key words, the number of pictures, and/or the sophistication of the HTML code, a determination is made as to whether a page is likely to be a personal home page. In one embodiment, the greater the quantity of personal-oriented key words and pictures, and the lower the code sophistication (for example, the absence or low level of script files, in line IFRAMES, custom tags), the greater the likelihood that the page is a personal web page. A score can be assigned by the search system based on such properties, and if the score exceeds a predetermined threshold, the search system will categorize the page as a personal home page.

With respect to the "commercial" or business category, by way of example, the search system can look for certain key words or phrases, such a "price," "quantity," "stock," "ship," "corporation," and/or "shopping cart." In addition, the search system can determine the level of sophistication of the HTML or other formatting code used to create the page. For example, the greater the use of script files, in line IFRAMES, custom tags, and the like, the greater the probable sophistication of the code. By way of example, based on the number of key words and/or the sophistication of the HTML code, a determination is made as to whether a page is likely to be a commercial or business page. In one embodiment, the greater the quantity of business-oriented key words, and the greater the code sophistication, the greater the likelihood that the page is a commercial or business web page. A score can be assigned by the search system based on such properties, and if the score exceeds a predetermined threshold, the search system will categorize the page as a commercial or business web page.

With respect to the links category, by way of example, the search system can rank pages based on the number of links and/or the quality of links that contain the search characters or strings. For example, if the user was interested in searching for information on Idealab, the user can enter the term Idealab in the links field, the greater the number of links a page has to the Idealab.com domain, the higher the search ranking. By way of example, the quality of the link can be based on how many links are alive or not broken and/or the quality of links on the linked pages.

At state 418C, as the user enters characters or strings into one or more column search fields, the search results displayed to the user are incrementally limited to those that contain the characters or strings entered by the user. In one embodiment, this narrowing process does not need to access remote search engines, as the search result information and Web pages are already cached locally. At state 420C, by clicking on an appropriate column header, the user can command the system to sort the search results at state 422C based on a selected column. At state 424C, clicking on the column header a second time reverses the sort order displayed to the user at state 426C.

The user can optionally print the information contained in the list pane or area 306C, as well as the Web pages displayed in the view pane or field 308C. In addition, the user can enter a Web address directly in the Address Field in the address field 312C, and then press the keyboard Enter button or the displayed Go button 312C to go to that page. As described below with respect to the favorites function, the user can cause the search application to add the address or URL to the user's favorites list by activating the plus (+) button 320C. Advantageously, the user can navigate through the found Web pages using the Forward and Backward control buttons 314C, 316C, and can refresh a Web page using a Refresh button 318C. The Backward control is configured to navigate to a previously viewed favorites Web page and the Forward control is configured to navigate a next favorites Web page.

To search the results or history of prior Internet and/or Web searches, a user can click on the History tab 312A and bring up the history search interface page, illustrated in FIG. 3D. The history process copies Web sites visited by the user, and indexes content and attributes for substantially instant searching of those historical Web pages. When the History interface is presented to the user, stored Web pages previously viewed in the search application's view pane or area 308D, and optionally, stored Web pages previously viewed using other user browsers, are listed in the history list pane or area 306D. Optionally, based on a user-selected option, the view pane or area 308D either shows page corresponding to a select item as the user saw it when on the date/time it was added to the history or the most recent version of the page in Internet Explorer's cache. These pages can be displayed in the view pane or area 308D even when the user is offline.

Figure 4D:
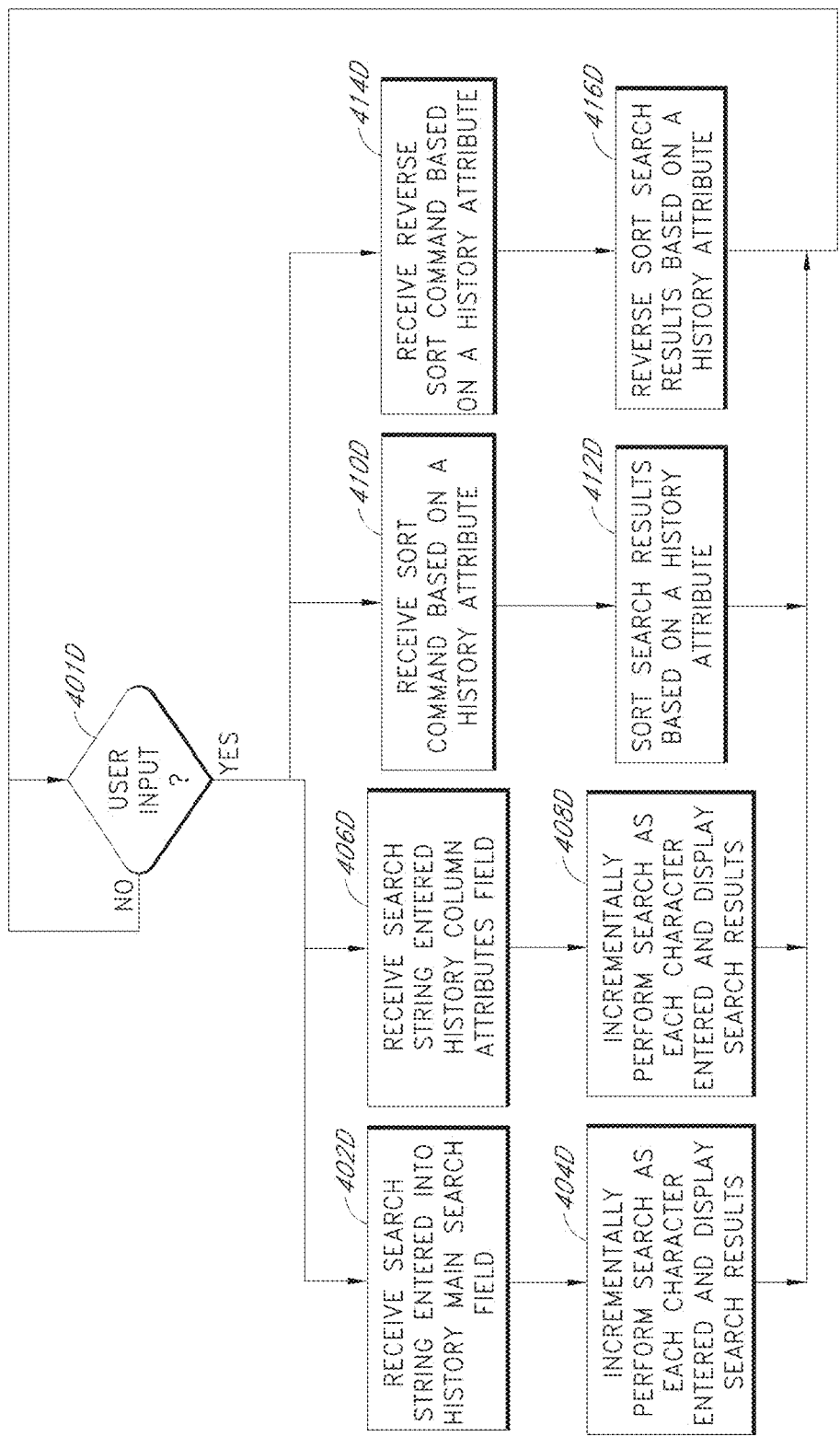

As illustrated in FIG. 4D, at state 401D the search system waits for a user input. The user input can be, for example, a search character string entered into the main search field, a search character string entered into an attribute search field, a sort command, or an inverse sort command.

At state 402D, alpha characters, numeric characters, words and/or phrases, such as those that may appear in the Web page contents, the Web site name or title, the Web page URL, the Web page size, the page category, the page domain, the page language, the links on the page, the data/time the Web page was last viewed, the search terms entered when the Web page was originally located by the search application, the name of the browser or other tool used to originally locate the Web page, and/or the media type used on the page that are entered by the user into the main search field 304D are received.

At state 404D, as the user enters characters into the main search field 304D the search of the listed items is incrementally performed by the search application's search engine, and the list pane or area 306D displays incrementally narrowed down search results. The view pane or area 308D displays the selected page. The user can optionally specify whether the view pane or area 308D will display the stored Web page, as the user saw it when the Web page was added to the history, or the most recent version of the page stored in a local cache, such as Microsoft's Internet Explorer's cache. Because, in one embodiment, the Web pages are cached, the previously viewed Web pages can be displayed in the view pane or area 308 even when the user's terminal is offline.

The user can also provide a relevant string or strings of characters in a corresponding column field to specify certain search result attributes, such as a content field, a date/time (last viewed) field 310D, a URL field, 312D, a title field 314D, a size field 316D, a media type field (not shown), a search term field 318D, and/or the browser originally used field (not shown), a Web page size field, a page category field, a page domain field, a page language field, and a links field, which are received at state 406D. At state 408D, as the user enters characters or strings into a column search field, the search is further incrementally performed by the search application's search engine, and the list pane or area 306D displays incrementally narrowed down search results. At states 410D, 412D, by clicking on an appropriate column header, the user can command the system to sort the search results based on a selected column. At states 414D, 416D clicking on the column header a second time reverses the sort order displayed to the user.

Optionally, the size of the history index can be limited based on size or date, which can be specified by the user. In one embodiment, the history functionality can integrated with the Web search tab, so that a user can search his/her history directly from the Web tab in addition to live Web searches. Optionally, the user can also enter a URL or address into the address field 320D to browse to a new URL and have that page added to the history. As described below with respect to the favorites function, the user can cause the search application to add the address or URL to the user's favorites list by activating the plus (+) button 322D.

With reference to FIG. 3E, the favorites function is used to select and display Web pages that the user often refers to and so wants to access quickly. The user can select an add favorites button, such as the plus (+) symbol in the history or Web interfaces, as illustrated in FIGS. 3C and 3D, above a Web page to cause the search application to add it to the user's favorites. In addition, the user can enter the desired address or URL of a Web page into address field 316E, and click the plus (+) button 318E to add the address to the user's favorites list, or click the minus (−) button 320E to remove the address displayed in the address field 316E from the user's favorites list. The Web pages included in the user's favorites are cached, attribute and content indexed, and once indexed, instantly searchable.

To search the cached favorites Web pages, a user can click on the favorites tab 314A and bring up the favorites search interface page, illustrated in FIG. 3E. In response to the user selecting the favorites search mode, user favorites are listed in the favorites list pane or area 306E. The view pane or area 308E either shows that page as the user saw it when on the date/time it was added to the favorites or the most recent version of the page in Internet Explorer's cache. These pages can be displayed in the view pane or area 308D even when the user is offline.

Figure 4E:
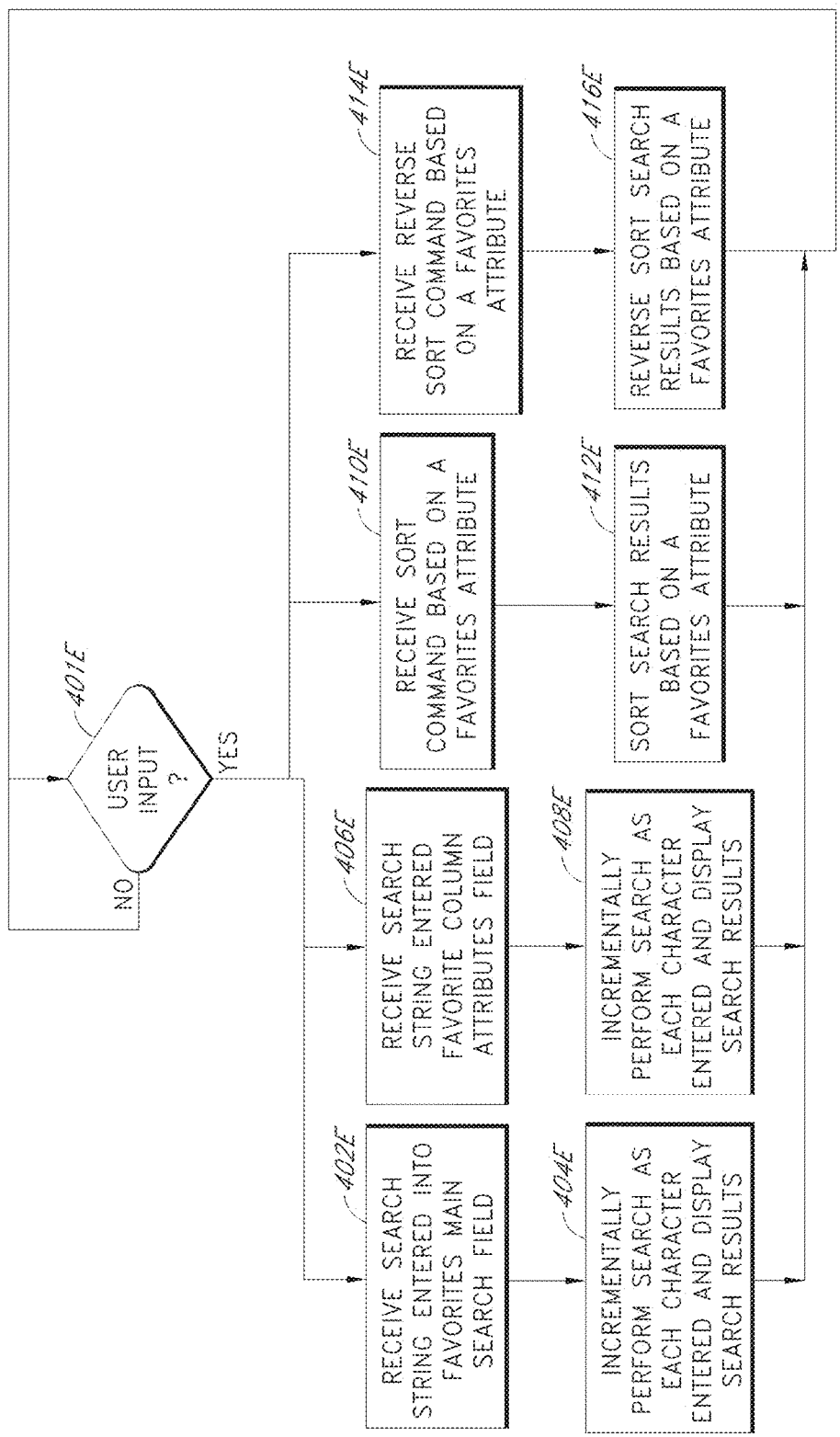

As illustrated in FIG. 4E, at state 401E the search system waits for a user input. If the user provides an entry into a main search field 304E, such as alpha characters, numeric characters, words and/or phrases that the user thinks may appear in the favorites Web page contents, the Web site name or title, and/or the Web page URL, the entries are received at state 402E. At state 404E, as the user enters characters into the main search field 304E the search is incrementally performed by the search application's search engine, and the list pane or area 306E displays incrementally narrowed down search results. The view pane or area 308E displays the selected page. The user can optionally specify whether the view pane or area 308E will display the stored Web page, as the user saw it when the Web page was added to the favorites, or the most recent version of the page stored in a local cache, such as Microsoft's Internet Explorer's cache. Because, in one embodiment, the Web pages are cached, the previously viewed Web pages can be displayed in the view pane or area 308 even when the user's terminal is offline.

The user can also provide a relevant string of characters in a corresponding column field, to specify certain search result attributes, such as a content field, a date/time (last viewed) field 310E, a URL field, 312E, a title field 314E, a size field 316E, a media type field (not shown), a search term field 318E, and/or the browser originally used field (not shown), a page category field, a page domain field, a page language field, and a links field, which are received at state 406E. At state 408E, as the user enters characters into a column search field, the search is further incrementally performed by the search application's search engine, and the list pane or area 306E displays incrementally narrowed down search results. At states 410E, 412E, by clicking on an appropriate column header, the user can command the system to sort the search results based on a selected column. At states 414E, 416E clicking on the column header a second time reverses the sort order displayed to the user.

Figure 4F:
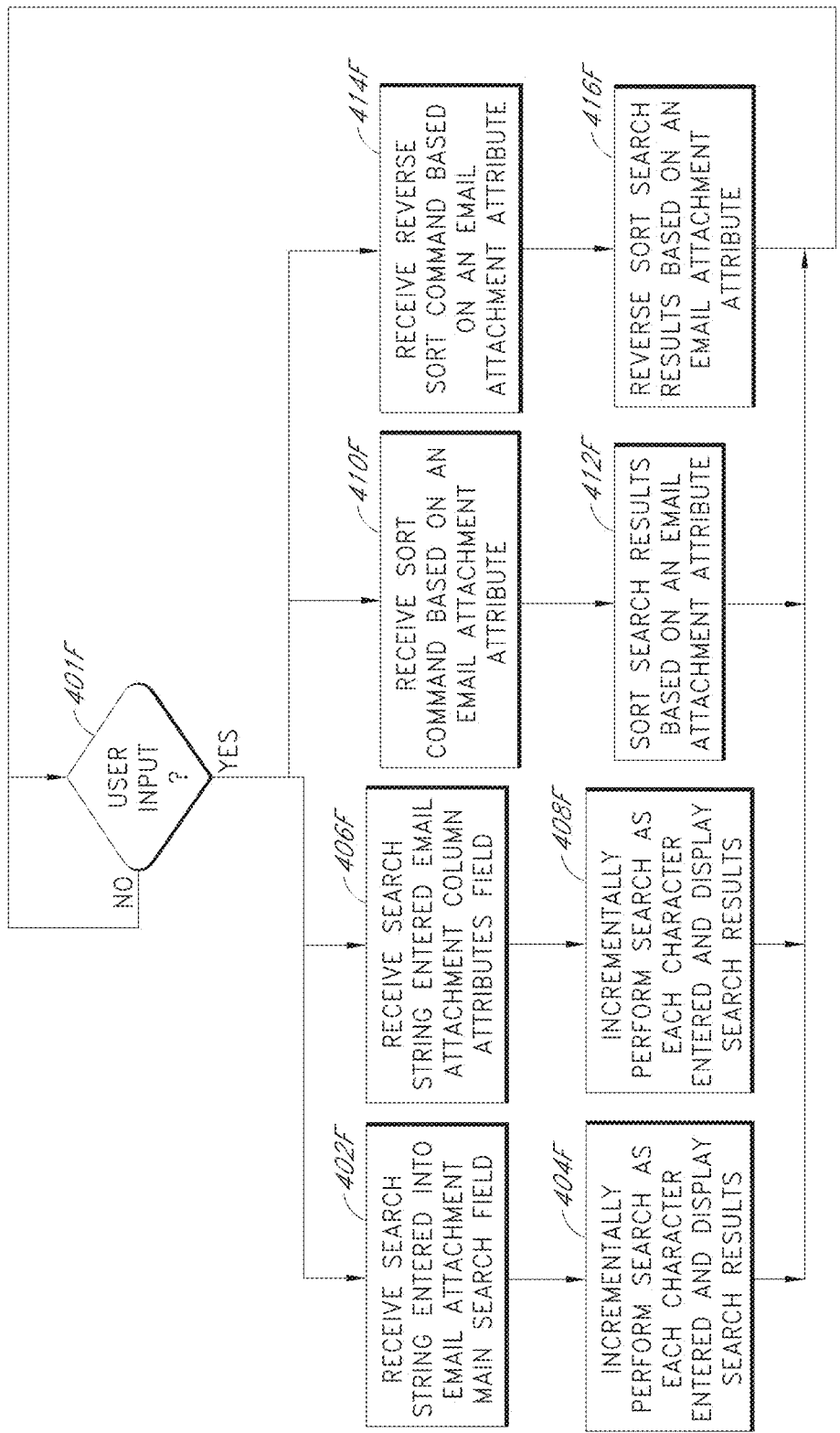

With reference to FIG. 3F, the attachment function is used to locate email attachments. To search for email attachments a user can click on the attachments tab 308A and bring up the attachments search interface page which lists attachments in the attachments list pane or area 306F. As illustrated in FIG. 4F, at state 401F the search system waits for a user input. The user can enter into a main search field 304F, alpha characters, numeric characters, words and/or phrases that the user thinks may appear in the desired attachment contents, name, date/time created, date/time received, from (sender) field, size, MIME tag, extension, and/or path, which are received at state 402F.

At state 404F, as the user enters characters into the main search field 304F the search is incrementally performed by the search application's search engine, and the list pane or area 306F displays incrementally narrowed down search results. The view pane or area 308F displays the selected page.

The user can also provide a relevant string of characters in a corresponding column field to specify certain search result attributes, such as a content field (now shown), a name field 310F, a date/time field 312F, a from (sender) field 314F, a size field 316F, a MIME tag field 318F, an extension field 320F, and/or a path field 322F which are received at state 406F. At state 412F, as the user enters characters into a column search field, the search is further incrementally performed by the search application's local search engine, and the list pane or area 306F displays incrementally narrowed down search results.

At states 410F, 412F, by clicking on an appropriate column header, the user can command the system to sort the search results based on a selected column. At states 414F, 416F clicking on the column header a second time reverses the sort order displayed to the user.

In one embodiment, a search interface page includes a selection menu that specifies which of email, attachments, files, the Web, favorites, and/or history (previously accessed and stored Web pages) targets, are to be searched. In accordance with the user selection one or more of the email, attachments, files, the Web, favorites, and/or history, or corresponding indexes will be searched. In this embodiment, the column attribute search fields optionally will correspond to the selected search targets. Thus, for example, if the user selects both email and files as search targets, the column attribute fields can include one or more of a from (sender) field, a to (addressee) field, date/time sent and/or received fields, a email folder path field, a client field, a cc field, a size field, and a bcc field, wherein the foregoing fields are appropriate for email searches, and one or more of a file name field, a file type field, a date last modified or created field, a file size field, and a file path field.

The search application 102 optionally ignores punctuation of a first set of punctuation when indexing and performing a search, such as an email or files search, and includes punctuation of a second set of punctuation in indexing and search operations. For example, the first set of punctuation can include hyphens, commas and/or semicolons. The second set of punctuation includes punctuation marks that are more likely to be useful when performing a search, such as the period or dot (.), commonly used in file extensions, and the "at" sign (@), which is commonly used in email addresses. Optionally, the user can specify which punctuation marks are to be included when indexing and performing searches, and which punctuation marks are to be ignored.

In one embodiment, when using a string of one or more characters as a search string on which to perform a search, such as an email or file content search, the search string is treated as a prefix. That is, the search string should match the initial characters and/or words in a potential matching string for the file or email to be displayed in the list pane or area. For example, if the search string is "act", the search application 102 will list a file containing the word "actual", but will not list a file if the only appearance of "act" is "fact."

The user can enter multiple separate search words or strings and each one will optionally be treated as a prefix. For example, searching "Joh Do" can be used to locate the strings "John Doe". Thus, one embodiment of the present invention provides multiword separate prefix searching. The searching can be performed incrementally. For example, if the user enter "Jo D" documents with the strings ("Jon" and "David"), ("Joe" and "Daniel"), ("John" and "Doe") will be located. If user then adds an "h" to "Jo" so that the search strings are now "Joh D" then the list of search results will be substantially immediately narrowed to present only documents having at least one string beginning with "Joh" and one string beginning with "D", such as a document containing ("John" and "Doe"). Further, the user can enter one or more additional search strings into one or more other search fields, such as one or more column search fields and the search system will incrementally search for documents that have strings that correspondingly begin with the search strings or that are exact matches for the search strings.

Optionally, when certain standard characters are present in a given attribute, such as the standard "www." in a URL, the search application treats the character following the standard characters as the first character. Thus, for example, when searching for the string "loc" by entering it in the URL field 310E in FIG. 3D, the URL "www.loc.gov.com" would be identified as a match. Optionally, the user can specify that the search application 102 should look for the search string no matter where it appears in a file or in email content.

In one embodiment, the main search field and/or attribute fields discussed above can act as a command line interface, in addition to acting as search fields. Thus, before executing or applying a search operation on one or more search strings, a determination is made as to whether the first search string corresponds to a command or is included in a list of command words. If the first word or string does correspond to a command word then a corresponding command file is read, and the corresponding command is executed. If there is more than one word or string entered into a search field, if the first word or string corresponds to a command word, then the subsequent words or strings are optionally treated as command arguments or terms, if appropriate. In addition, command files can call other command files by including the called command file name and relevant arguments. The list of command word can grow or shrink as the user adds or deletes commands. The present invention is not limited to receiving commands into a search filed. In other embodiments, other data entry fields can be used to enter commands as well as data.

By way of example, the command words can include email (corresponding to a command to create an email using the following term to determine who the addressee is), shop (corresponding to a command for finding the lowest online price for the product named in the following term), book (corresponding to a command for finding a book at a named Web site), movies (corresponding to a command for finding a listing of show times at a named Web site), web (corresponding to a command for launching a browser, and if there is a URL following the "web" then the browser is launched to that URL), convert (corresponding to a command used to convert from one set of units or currency to another), msword (corresponding to a command to launch msword, and if there is a following term, open or create a document with a name corresponding to the term), programname (corresponding to a command to launch the program having the name programname), semail (corresponding to a command to search the email index using the following string (s)), sfiles (corresponding to a command to search the files index using the following string(s)), and so on with respect to the other search targets.

The command names can correspond to command files, which for example, can have the extension ".do," though other extensions can be used as well. The command files can optionally be programmed, created and/or edited by an end user, thereby providing for significant customizing by users and without requiring sophisticated programming skills. Further, the user can add additional commands as desired. In addition, the command names can be names selected by the user that are easy for the user to remember, as opposed to arbitrary names, or difficult to remember names. The instructions included in the command files can be instructions unique to the search application, instructions corresponding to other applications, and/or instructions that correspond to operating system instructions. Thus, a search field can also be used as a DOS, UNIX, LINUX, or other operating system command line. The command file can also include a URL.

For example, if the user types "president bush" in the files search mode main search field, then the search application searches for a file that includes the terms "president" and "bush." But if the user types "email samantha jones" the search application compares the first string, "email", with the command list, recognizes that email is on the command list and that email is a command, retrieves an "email.do" command file that specifies how the command is to be processed, accordingly processes the term "samantha jones", and generates a blank email to samantha jones by looking up the email address for samantha jones in the user's email application.

By way of another example, if the user types in "semail samantha jones" the search application compares the first string, "semail", with the command list, recognizes that semail is on the command list and that semail is a command, processes the rest of the line as an "semail" command, in this case a search within the user's indexed email for the strings "samantha" and "jones".

Optionally, some of the commands can be built into the search application, and do not utilize a separate command file. For example, the semail, sfiles, and/or web commands can be built in and not use a separate command file.

Optionally, the results of the command are displayed using the list area and/or the view area. For example, with respect to the "semail" command, the list and view areas are employed as similarly described above with respect to FIG. 3A.

At times, the arguments following a user-entered command may result in ambiguity in one of the arguments that are to be processed. For example, with respect to the convert command, where there is ambiguity, the user can be presented with several options from which the user can select. By way of example, if the user types "convert 5 miles" then the list area can be used to display user selectable choices, such as "meters", "feet", and "kilometers". If the user selects one of the choices, the search application will display the results in the view area. Thus, if the user selects "kilometers" the convert command with convert 5 miles into corresponding kilometers, and displays the results in the view area.

In another example, a command can be used to quickly retrieve information from a specific URL via the search application. For example, the book command file can include the following:
 web http://search.barnesandnoble.com/booksearch/results.asp?WRD=$1

By way of further example, the movies command file can include the following:
 web http://movies.yahoo.comishowtimes/showtimes.html?z=$1

The parameter "$1" in the above examples is filled in by the following string entered by the user. For example if the user typed in the entry "movies lord" the movies command would launch a browser, access the yahoo movie show time site, submit the string "lord", and the show times for movies that include the string "lord", such as "Lord of the Rings" would be displayed to the user. If the string(s) following the command word are not HTML compliant, such as containing a space, HTML-escaping is performed, and the string(s) that are in violation will optionally be converted into an HTML compliant string, such a by replacing the space with a +sign. Thus, "lord rings" is optionally converted into "lord+rings."

Advantageously, in certain embodiments, indexing of multiple forms of a word is performed, and where punctuation marks are in a word or character string, the word and character string can be selectively broken into multiple words or strings which can reduce index size and facilitate searching. For example, when indexing, a set of punctuation is optionally declared non-word symbols and are treated as spaces to separate words. For example, this set can include: <([{". The foregoing example set members are selected because the included symbols are often used as open-parentheses and thus, a following character string can often be considered to be a new word. In addition, the double-quote is rarely used as a word joiner. Some characters, such as the < characters, are treated as a non-word symbol because they appear very frequently in HTML code used to used to generate Web pages. By excluding such characters, strings such as word</b></font> are advantageously not treated as a word.

Optionally, punctuation not included in the set of excluded punctuation discussed above will be treated as the same as punctuation in the set only if the punctuation is within N characters of the start of the word. For example, N can be set at 2 or at another value. Optionally, punctuation not included in the set of excluded punctuation will be treated as a space if the punctuation is after P characters of the start of the word. For example, P can be set at 3, or 5, or at another value. By way of further example, if N=2 and M=3, xy.com would be indexed as one word because the period is not within 2 characters of the start of the string and is not more than 3 characters after the string. In another example, if N=2 and M=3, nbc.org is treated as two words, nbc and org because the period is more than 3 positions away from the start of the string.

The values of M and P are selected so that the portion of a word or character string before the punctuation is long enough, such that even if the string is treated as two separate words or strings each string will be sufficiently unique or identifiable for searching purposes. However, if the punctuation occurs too near the beginning of a word or string, treating the prefix as a separate word or string may not provide enough characters for a user to recognize the word or string. For example, if "a.m." were broken into two one word strings, "a" and "m", the search results would not be as useful or may not be useful at all.

Optionally, the index process indexes the individual words separated by punctuation, so that for xy.com, xy and com are separately indexed.

By way of further examples, if N=2 and P=5, then for johndoe@zxcv.ca, all the punctuation marks are treated as spaces and the following strings are separately indexed: johndoe, zxvc, ca. Similarly, the string me@mnbvcxza.net is treated as a word or a single string. For the string 1,234,467, 1,234 is treated as a word or single character string, and 467 is treated as a word or character string.

Further, a user can exclude files, emails, and the like that contain a specified string from appearing in search results displayed to the user. For example, in one embodiment, the user can exclude files or email containing a particular string by putting a minus sign at the beginning of the character string when entering it into the main search field or other relevant column field. If a user wants to search for a file that does not contain a first string as a prefix or exact match, and does contain a second string as a prefix or exact match, the user can put a minus sign in front of the string to be excluded, then follow that string by one or more spaces, and then the character string to be included. For example, if the user searches for an email that does not contain, as a prefix or exact match, the string "Fred" (or "Frederick", "Fred-erica", or other string or word with "Fred") and does include the string "Sol" (or "Solly", Sole, or Solomon"), the user would enter "-Fred Sol".

Thus, as described above, certain embodiments of the present invention provide advantageously provide for incremental searching for a variety of search targets. For example, the search targets can include one or more of files, emails, email attachments, Web pages, specific databases, and/or the like. Because a search is performed incrementally, the search results are provided or narrowed substantially immediately after each character is a search string is entered by a user. Thus, the user is provided with substantially immediate feedback as the search string is being entered, and so can quickly decide on the desirability of entering additional search characters, or of entering a new search string.

In addition, the user can specify that an exact word match is to be performed. In one example embodiment, if a selected punctuation symbol, such as =, follows a word or character string directly, and is followed by a space, as in "mark=", then the word is searched as an exact match. In addition, optionally, if a selected punctuation symbol, which can be a !, @, #, $, %, ^, &, *,), ;, :, ', ", ?, >, and/or other punctuation symbol, follows a word or character string directly, and is followed by a space, as in "mark$" or "mark." or "mark-", then optionally the word is searched as an exact match including the punctuation. So "mark-" will not match "market" or "mark. However, "mark-" will match "mark-down."

In another embodiment, the search system described above is server-based, and the user can access the search functionally using a thin client. Thus, for example, the user does not need to download to or otherwise store the search application on the user's terminal. Instead, the user can access over a network a remote search system and engine using a browser. The remote search system can be used to incrementally search content original to a Web site or database associated with the remote search system, and/or to search data that resides or originally resided on another Web site or network site. Nonetheless, even though the search engine is remotely located, once initial search results are transmitted to the thin client, the used can quickly scroll down and view the content corresponding to the items in the search results as if the search application was hosted by the thin client.

Figure 5:
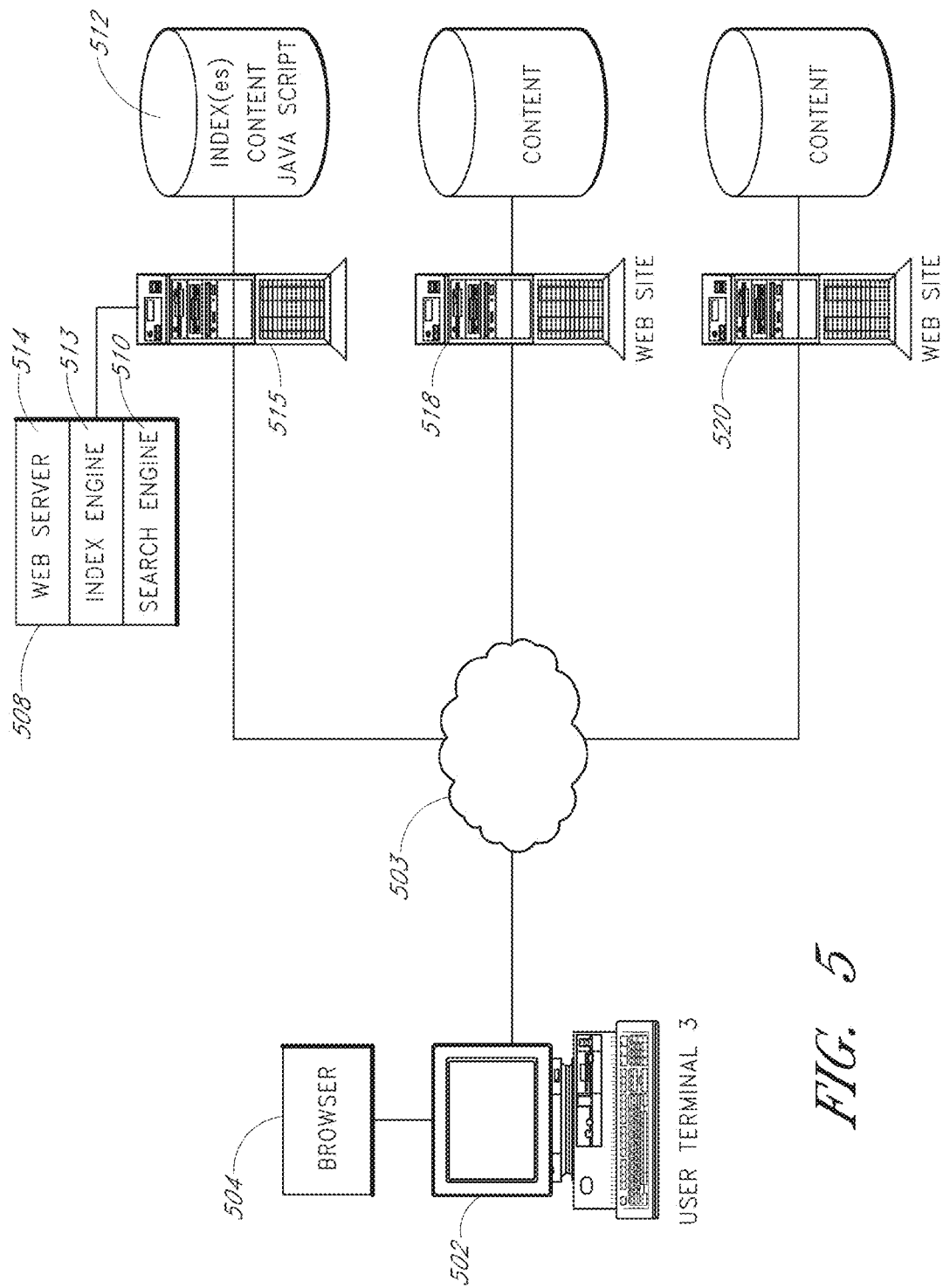
FIG. 5 illustrates an example computer system that can be used to provide a server based search system in accordance with one embodiment of the present invention.

FIG. 5 illustrates an example computer system that can be used to provide a server based incremental search system. As depicted, one embodiment includes a browser 504 stored on and executed by a user terminal 502. While in the illustrated embodiment the terminal 502 is a thin client, it can optionally include a local index engine, local search engine, and email application similar or identical to those discussed above with reference to terminal 104 illustrated in FIG. 1. In the example embodiment, the browser 504 can interpret HTML tags, handle IFRAMES, and execute JavaScript. The terminal 502 is coupled to a remote site 508 via a network 506, which can be, by way of example, the Internet. The terminal 502 can be coupled to the Internet using a network interface circuit and port.

The remote site 508 includes a computer server 515 that executes and hosts a search engine 510, an index engine 513, and a Web server 514. The computer server 515 includes one or more content and index databases 512 and JavaScript, which will be discussed in greater detail below. The search and index engines 510, 513 can be the same as or similar to the search engine 107, index engine 103, search engine 110, and index engine 103 discussed above, and can provide the same or similar functionality. The Web site 108 and search engine 110 are accessible to the search application 102 via the Internet 113. The remote site 508 can be coupled to the Internet using a network interface circuit and port. The Web site 108 may optionally include content that spans multiple Internet domains, and/or may be implemented using physical servers that are geographically remote from one another. In other embodiments, the Web site 108 may be in the form of an intranet site, in which case the terminal 502 may be coupled to the site by a private network. For example, Web site 508 may be in the form of an internal corporate store site for company employees.

By way of example, the search engine 510 may search local server-based databases of the full text of Web pages selected from selected Web pages. The databases can optionally be generated using a spider or the like that search for Web pages on other Web sites, such as Web sites 518, 520, which are then stored in the databases, and that follow the links in those Web pages to other Web pages, which are then stored in the databases. Because the Web page databases, or portions thereof, may have been generated before a user submits a search query, these databases may not be fully current. When the search engine 510 performs a Web search in response to a user query, the search engine returns excerpts from relevant Web pages as stored in a corresponding database, and also returns links to the current version of the Web pages, if such exists.

By way of further example, as similarly discussed above with reference to FIG. 1, the server system can create indexes such as those illustrated in FIG. 2A using the process illustrated in FIG. 2C, can create prefix indexes, and can pre-compute sort lists.

Figure 6:
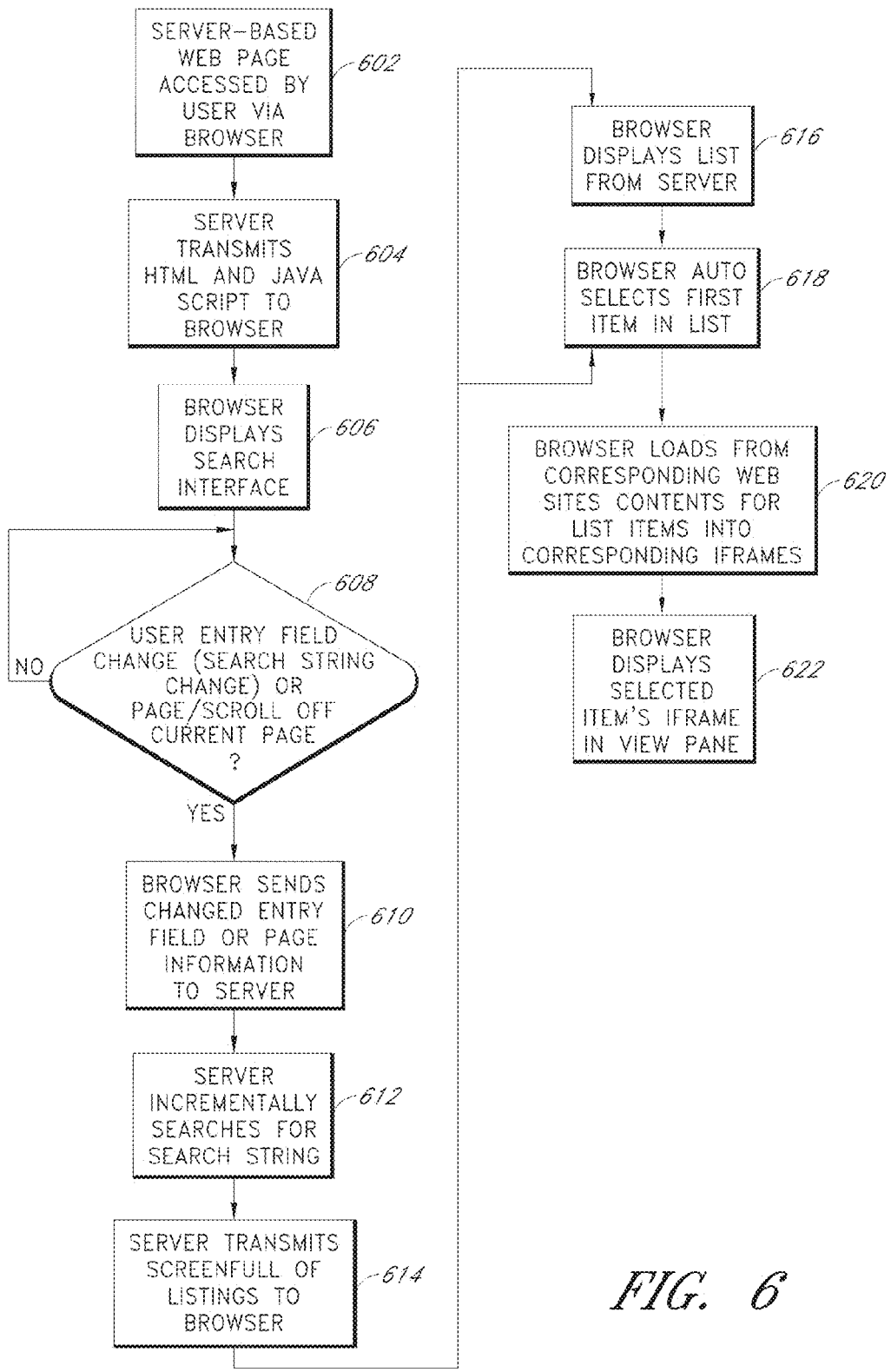
FIG. 6 illustrates an example search process using the server based search system.

FIG. 6 illustrates an example search process using the server based search system. At state 602, the user accesses via the browser 504 the server based system 508 over the Internet 506. At state 504, the server system 508 transmits HTML, and/or other formatting code, text, and JavaScript to the browser 504. JavaScript is a client-side scripting language that runs inside an Internet browser or Web client. JavaScript can be embedded in Web pages or in other HTML documents. JavaScript can be used to enhance Web page dynamics and interactivity, and can be used to perform calculations, check forms, generate new HTML pages using variable information, open and close windows and frames, and the like. When the browser loads a page that includes JavaScript code, the browser's interpreter reads and executes the JavaScript code.

At state 606 the HTML code is rendered by the browser 504, the JavaScript is executed, and the browser 504 displays the search interface as similarly discussed above with reference to FIGS. 3A-I. Thus, for example, the search interface can include a list pane or area and a view pane or area, and well as the search area, including a main search field and column attribute fields. As similarly discussed above, the user can select a particular target search interface by clicking on an appropriate tab or link. For example, a given target search interface can include a plurality of search fields, including a main search field and a plurality of search fields. Thus, as similarly discussed above, an Internet search interface can include one or more of a content field, a URL field, a title or Web site name field, a size field, a date field, a format field, a category field, a site field, a links field, and a language field, and a media type field.

At state 608, the browser, via the executed JavaScript, monitors user inputs or deletions from the interface fields. For example, the user can enter into the main search field and/or into one or more attribute search fields one or more alpha characters, numeric characters, words and/or phrases that the user thinks may appear in the target content or attributes. In addition, the browser monitors and detects whether the user is paging up or down, or is scrolling off the page. Optionally, the browser continuously monitors and detects user inputs, deletions, scrolling, and/or paging up or down (collectively and individually also referred to as "user changes") during states 610-622, and if such is detected, the process proceeds or returns to state 610. At state 610 the browser transmits the user changes to the server system 508.

At state 612 the server system 508 incrementally searches for Web pages, documents, or other files in accordance with the search character, characters, string, or strings received by the server system 508. Thus, with each additional character entered by the user and detected at state 608, the search engine 510 will further refine the search. Similarly, with each deletion of a search string character, the search engine 510 will reduce the amount of search filtering to broaden the search. For example, when the user types "fast", four separate searches are optionally sent to the server, one for "f", one for "fa", one for "fas", and one for "fast". Each time, the server finds all documents containing words starting with that sequence of letters, and returns a list of the top matches. At state 614 the server system 508 transmits a list of search results to the browser 504.

In one embodiment, the JavaScript optionally instructs the server system 508 how many results to return, so that only as many results as are needed to fill the list pane are transmitted. Advantageously, this reduces the load on the server system 508, increases the speed of presentation, and yet provides to the user the illusion that the list goes on further. In such an embodiment, when the user presses the PgDn button, clicks a More button, or scrolls down the list, an additional request is sent to the server for the next pagefull of results.

Optionally, to determine how long the transmitted search result list should be, the server system 508 autodetects the number of lines the browser 504 can display at a time. Optionally, the user can instruct the server system 508 on how long the list should be.

At state 616 the browser 504 displays the list in the list pane or area. At state 618, the browser 504 automatically selects the first item in the search result list to be displayed in the content pane or area. At state 620 to accelerate the presentation of content in the view pane for a selected item in the list pane, the pages or documents corresponding to the search result entries in the list pane are preloaded as soon as the list is received from the server system 508. The JavaScript loads IFRAMEs for each of the Web pages corresponding to the list entries. An inline floating frame or IFRAME is a construct which embeds a document into an HTML document so that embedded data can be displayed inside a subwindow of the browser's window. The IFRAME tag creates a floating frame at its location in the HTML file. The SRC attribute, which sets or retrieves a URL to be loaded, specifies the content to be displayed within the frame.

Thus, the Web page content loaded onto user's computer 502, while keeping hidden the display of the Web page content. Then, to present the content or Web page corresponding to a selected search list entry, the JavaScript renders the corresponding IFRAME visible in the view pane.

Figure 7:
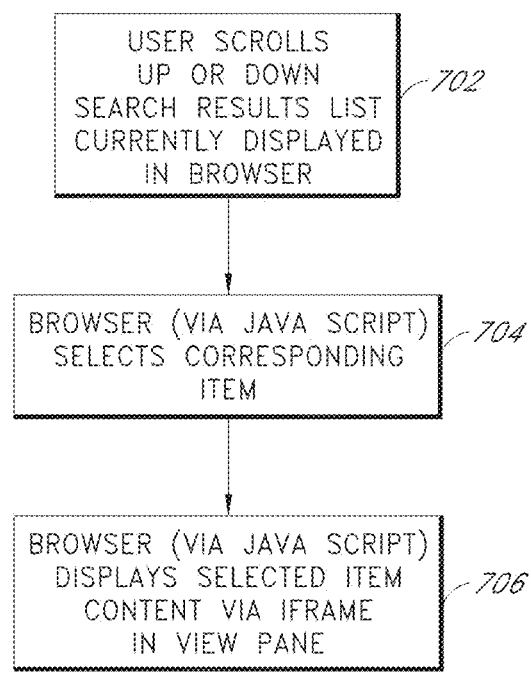
FIG. 7 illustrates an example process of scrolling through a search list.

FIG. 7 illustrates an example process of scrolling through a search list loaded via a browser as described above with reference to FIGS. 5 and 6. At state 702, the JavaScript detects when the user is scrolling up and down the list displayed in the browser 504. At state 704, the browser selects the corresponding search list item for display in the view pane. At state 706 the browser 504 displays the selected search result content that had already been stored in an IFRAME in the view pane. Advantageously, because the content for each item in the list has already been preloaded, the scrolling and content display takes place substantially instantaneously and the Internet does not have to be accessed.

Thus, as described above, certain embodiments of the present invention provide an efficient user interface, and advantageously provides for incremental searching for a variety of search targets using client-based or server-based search applications. Because search can be performed incrementally, the user is provided with substantially immediate feedback as the search string is being entered, and so can quickly decide on the desirability of entering additional search characters. Advantageously, the user interface provides target specific attribute search fields, thereby enabling a user to efficiently locate the desired email, files, attachments, Web pages, and the like. In addition, in certain embodiments, incremental indexing is performed, thereby providing consistently current search indexes. Advantageously, in certain embodiments indexing of multiple forms of a word is performed, and where punctuation marks are in a word or character string, the word and character string can be selectively broken into multiple words or strings which can reduce index size and facilitate searching.

It should be understood that certain variations and modifications of this invention would suggest themselves to one of ordinary skill in the art. The scope of the present invention is not to be limited by the illustrations or the foregoing.

What is claimed is:

1. A method of performing a search comprising:
receiving a first partial search string in a first search field;
receiving a second partial search string in the first search field;
wherein the first and second partial search strings are separated by a string separator character in the first search field;
incrementally searching a set of documents in order to identify search results, wherein the incrementally searching comprises:
searching for a first one or more documents each including at least one string that corresponds to the first partial search string;
searching for a second one or more documents each including at least one string that corresponds to the second partial search string; and
updating the search results as each successive character of the first partial search string and the second partial search string is received respectively in the first search field by identifying one or more documents included in both the first one or more documents and the second one or more documents, wherein the first partial search string and the second partial search string are non-adjacent in at least one of the identified documents.

2. The method of claim 1, wherein the first partial search string comprises characters corresponding to at least a portion of a first string being searched for and the second partial search string comprises characters corresponding to at least a portion of a second string being searched for.

3. The method of claim 1, further comprising:
displaying in a user interface an indication of the identified one or more documents included in both the first one or more documents and the second one or more documents.

4. The method of claim 3, further comprising displaying via the user interface a portion of a selected identified document.

5. The method of claim 4, further comprising highlighting a plurality of occurrences of the first and second partial search strings in the selected document while not highlighting portions of text between occurrences of the first and second partial search strings in the selected document.

6. The method of claim 1, wherein the string separator character is selected from the group comprising a space, "<", "(", "[", "{", " " ", "!", "@", "#", "$", "%", "^", "&", "*", ")", ";", ":", """", "?", ">", ",", "=", and "+".

7. The method of claim 1, wherein the documents comprise emails, text documents, contact information, appointment information, task information, music files, system files, photographs, and/or images.

8. The method of claim 1, wherein at least some of the documents comprise at least the following email fields in which one or more of the first and second partial search strings may be located: to, from, cc, bcc, subject, folder name, date, size, attachments or body.

9. The method of claim 1, wherein at least some of the documents comprise at least the following file fields in which one or more of the first and second partial search strings may be located: name, path, size, item type, date modified, date created, or content.

10. The method of claim 1, wherein at least some of the documents comprise at least the following contacts fields in which one or more of the first and second partial search strings may be located: name, email address, phone number, company, job title, or content.

11. The method of claim 1, wherein at least some of the documents comprise at least the following calendar fields in which one or more of the first and second partial search strings may be located: subject, start date/time, duration, recipients, location, recurrence, attendees, attachments, or content.

12. The method of claim 1, wherein the search field corresponds to a single field of the documents and the incremental searching is performed only on content of the single field of the documents.

13. The method of claim 12, wherein the single field of the documents comprises one of: to, from, cc, bcc, subject, folder name, date, size, attachments, or body fields of email documents.

14. The method of claim 12, wherein the single field of the documents comprises one of: name, path, size, item type, date modified, date created, or content fields of file documents.

15. The method of claim 12, wherein the single field of the documents comprises one of: name, email address, phone number, company, job title, or content fields of contacts documents.

16. The method of claim 12, wherein the single field of the documents comprises one of: subject, start date/time, duration, recipients, location, recurrence, attendees, attachments, or content fields of calendar documents.

17. The method of claim 1, wherein the first partial search string applies to all textual content of the set of documents and the incremental searching of the second partial search string is performed only on content of a single field of documents within the set of documents.

18. The method of claim 17, wherein the single field of the documents comprises one of: to, from, cc, bcc, subject, folder name, date, size, attachments, or body fields of email documents.

19. The method of claim 17, wherein the single field of the documents comprises one of: name, path, size, item type, date modified, date created, or content fields of file documents.

20. The method of claim 17, wherein the single field of the documents comprises one of: name, email address, phone number, company, job title, or content fields of contacts documents.

21. The method of claim 17, wherein the single field of the documents comprises one of: subject, start date/time, duration, recipients, location, recurrence, attendees, attachments, or content fields of calendar documents.

22. The method of claim 1, where modifiers can be applied to either or both of the first partial search string and second partial search string to include one or more operators from the group comprising AND, OR, NOT, NEAR, date ranges, and size ranges.

23. A computing system comprising:
one or more hardware computer processors executing software to:
receive a first partial search string in a first search field;
receive a second partial search string in the first search field;
wherein the first and second partial search strings are separated by a string separator character in the first search field;
incrementally search a set of documents in order to identify search results, wherein the incrementally searching comprises:
searching for a first one or more documents each including at least one string that corresponds to the first partial search string;
searching for a second one or more documents each including at least one string that corresponds to the second partial search string; and
updating the search results as each successive character of the first partial search string and the second partial search string is received respectively in the first search field by identifying one or more documents included in both the first one or more documents and the second one or more documents, wherein the first partial search string and the second partial search string are non-adjacent in at least one of the identified documents.

24. The computing system of claim 23, wherein executing the software further causes the computing system to:
display, on a display device of the computing system, a user interface including an indication of the identified one or more documents included in both the first one or more documents and the second one or more documents.

25. The computing system of claim 24, wherein executing the software further causes the computing system to:
display via the user interface a portion of a selected identified document.

26. The computing system of claim 25, wherein executing the software further causes the computing system to:
highlight in the user interface a plurality of occurrences of the first and second partial search strings in the selected document while not highlighting portions between occurrences of the first and second partial search strings in the selected document.

27. A non-transitory storage device storing software readable by a computing system to:
receive a first partial search string in a first search field;
receive a second partial search string in the first search field;
wherein the first and second partial search strings are separated by a string separator character in the first search field;
incrementally search a set of documents in order to identify search results, wherein the incrementally searching comprises:
searching for a first one or more documents each including at least one string that corresponds to the first partial search string;
searching for a second one or more documents each including at least one string that corresponds to the second partial search string; and
updating the search results as each successive character of the first partial search string and the second partial search string is received respectively in the first search field by identifying one or more documents included in both the first one or more documents and the second one or more documents, wherein the first partial search string and the second partial search string are non-adjacent in at least one of the identified documents.

* * * * *